US011910507B2

(12) United States Patent
Dyck et al.

(10) Patent No.: US 11,910,507 B2
(45) Date of Patent: Feb. 20, 2024

(54) SYSTEMS AND METHODS FOR PROVIDING INTERACTIVE MODULAR LIGHTING

(71) Applicant: NANOGRID LIMITED, Sheung Wan (CN)

(72) Inventors: Nathan Dyck, Toronto (CA); Tomas Rodinger, Vancouver (CA); Aliakbar Juzer Eski, Mississauga (CA); Lei Zhang, Toronto (CA); Jennelle W. Y. Wong, Aurora (CA)

(73) Assignee: Nanogrid Limited, Sheung Wan (HK)

(*) Notice: Subject to any disclaimer, the term of this patent is extended or adjusted under 35 U.S.C. 154(b) by 0 days.

(21) Appl. No.: 17/884,291

(22) Filed: Aug. 9, 2022

(65) Prior Publication Data

US 2022/0386434 A1 Dec. 1, 2022

Related U.S. Application Data

(63) Continuation of application No. 17/298,390, filed as application No. PCT/IB2019/060303 on Nov. 28, 2019, now Pat. No. 11,412,597.

(Continued)

(51) Int. Cl.
*H05B 47/105* (2020.01)
*H05B 45/20* (2020.01)

(52) U.S. Cl.
CPC .......... *H05B 47/105* (2020.01); *H05B 45/20* (2020.01)

(58) Field of Classification Search
CPC ...... H05B 45/00; H05B 47/10; H05B 47/105; H05B 47/155; H05B 47/175; H05B 45/20; H05B 45/10; Y02B 20/40
See application file for complete search history.

(56) References Cited

U.S. PATENT DOCUMENTS 7,352,339 B2 4/2008 Morgan et al.
8,576,183 B2 11/2013 Rabenstein et al.
(Continued)

FOREIGN PATENT DOCUMENTS

CN 102324210 A 1/2012
CN 102821507 A 12/2012
(Continued)

OTHER PUBLICATIONS

European Patent Office, Supplemental European Search Report, EP 19890309, dated Jul. 12, 2022, DE.
(Continued)

*Primary Examiner* — Haissa Philogene
(74) *Attorney, Agent, or Firm* — Reichel Stohry Dean LLP; Natalie J. Dean

(57) ABSTRACT

Systems and methods for an interactive modular lighting system are described. The lighting systems enable users to dynamically build a luminaire through a modular joining of individual light-emitting units, however such that risk of electrical failure is automatically prevented through a dynamic computation of electrical circuit properties and dynamic configuration of components. Additionally, lighting systems with granular and configurable touch sensing are described, wherein a user's interaction with the lighting system can be coupled to actuation of properties of the lighting system or of properties of other devices in communication with the lighting system. Illustrative embodiments of applications of said lighting systems in smart home and gaming are provided.

20 Claims, 9 Drawing Sheets

Related U.S. Application Data

(60) Provisional application No. 62/772,508, filed on Nov. 28, 2018.

(56) References Cited

U.S. PATENT DOCUMENTS

| | | | | |
|---|---|---|---|---|
| 11,412,597 | B2 * | 8/2022 | Dyck | H05B 47/175 |
| 2005/0151489 | A1 | 7/2005 | Lys et al. | |
| 2006/0237636 | A1 * | 10/2006 | Lyons | F21S 10/02 250/228 |
| 2008/0094005 | A1 | 4/2008 | Rabiner et al. | |
| 2011/0069013 | A1 | 3/2011 | Rabenstein et al. | |
| 2011/0121752 | A1 * | 5/2011 | Newman, Jr. | H05B 39/048 315/291 |
| 2012/0235579 | A1 | 9/2012 | Chemel et al. | |
| 2015/0061511 | A1 * | 3/2015 | Chemel | H05B 47/155 315/153 |
| 2017/0026498 | A1 * | 1/2017 | Goldfain | H02J 7/342 |

FOREIGN PATENT DOCUMENTS

| | | | |
|---|---|---|---|
| WO | 2008051464 | A1 | 5/2008 |
| WO | 2017181291 | A1 | 10/2017 |

OTHER PUBLICATIONS

National Intellectual Property Administration, International Search Report, PCT Application No. PCT/IB2019/060303, dated Mar. 10, 2020.

National Intellectual Property Administration, Written Opinion of the International Searching Authority, PCT Application No. PCT/IB2019/060303, dated Mar. 10, 2020.

* cited by examiner

SYSTEMS AND METHODS FOR PROVIDING INTERACTIVE MODULAR LIGHTING

PRIORITY

The present application is related to, claims the benefit of priority to, and is a continuation application of U.S. application Ser. No. 17/298,390 filed May 28, 2021 and which issues as U.S. Pat. No. 11,412,597 on Aug. 9, 2022, which is related to, claims the priority benefit of, and is a 35 U.S.C. 371 national stage application of International Patent Application Serial No. PCT/IB2019/060303, filed Nov. 28, 2019, which claims the priority benefit of U.S. Provisional Patent Application No. 62/772,508, entitled "SYSTEMS AND METHODS FOR COUPLED MODULAR LUMINARIES", filed Nov. 28, 2018. The entire contents of each of the aforementioned priority applications are expressly incorporated herein by reference in their entireties.

FIELD

Embodiments generally relate to the field of lighting devices, and more specifically, to lighting systems coupled in a modular fashion, and lighting systems coupled in a modular fashion and responsive to multimodal user interaction.

BACKGROUND

Architecture and interior design elements provide various applications in which controlled lighting is desirable.

Lighting may impact the mood and well-being of occupants, and may provide a pleasing aesthetic quality to an environment. Individual light-emitting units can be ubiquitous in a space in order to provide functional illumination.

Therefore, light-emitting units functionally enhanced to sense or receive input from the space and the inhabitants thereof can expand the utility a space offers its inhabitants.

However, providing coupled and/or controllable and/or sensor-enriched lighting and lighting devices may be technically challenging given that it may be desirable to have the lighting devices flexibly adapt to various types of environments.

SUMMARY

Systems and methods for an interactive modular lighting system are described.

A lighting system, which can be both spatially and optically configured by the user to a considerable degree, has many possible advantages. For example, aesthetic or architectural requirements become easier to meet without costly custom manufacturing, and light that is precisely adaptable to varying activities and individual needs, become possible.

A challenge with interactive modular lighting systems is that there is a need for increased protection against electrical failure. For example, as users modularly join lighting units, there is a potential risk of electric shock. As fewer spatial and optical constraints are put on the user of the lighting system, the scope of possible ways the components of the lighting system and its control logic can be operated in increase as well.

Without additional countervailing design of components and control logic, the user might therefore inadvertently configure the lighting system such that components exceed critical limits. For example, electrical current can be supplied to components through conductive metal traces, however, due to electrical resistance, heat is generated, which, if too great, would damage the lighting system.

A dual technical challenge presents itself: how to prevent faulty operations of a lighting system that can be configured in a myriad of ways, and how to advice the user on how to alter a lighting system configuration in order to attain desired outcomes without risk of operational failure.

An improved mechanism is described in various embodiments that is utilized to computationally infer operational failure conditions through monitoring electrical properties of the lighting system. In particular, the brighter a lighting unit is operated, the higher an impact relating to a risk of failure is possible.

With respect to the former technical challenge, the solutions described in detail below in some embodiments build on three key parts: data representing information about the spatial configuration, data representing information about electrical relations, and mechanisms to control the optical output of each individual component that are part of the lighting system.

From said data an inference is made through rapid and automatic computation if the particular lighting system a user has assembled is at risk of operational failure, and if so, where. The mechanism to control the optical output is then used to impose specific limits to the particular lighting system. On account of this approach, no universal limits must be imposed, and still even a user lacking any skills in electrical engineering can creatively assemble a lighting system unencumbered by concerns of possible operational failure.

With respect to the latter technical challenge, one should consider how to avoid or reduce specific limits as inferred by the solution to the former technical challenge. An especially fruitful inference to make in this regard, is which placement of power supplies to a particular lighting system would allow the widest possible range of creative optical outputs still removed from risks of operational failure.

A placement of a power supply can include automatically determining where (and guidance thereof) on the lighting system to connect the cables from the electrical sockets. Employing the same information as in the former solution, one or more ideal placements are inferred in some embodiments and shown to the user through selective illumination of these positions of the lighting system (e.g., specific visual emissions are controlled to denote optimal/suboptimal positioning of the power supply, the visual emissions including a control of tone output or brightness output levels controlled through modified output voltages). On account of this approach, a user lacking any skills in electrical engineering can still assemble a lighting system in the desired spatial arrangement, while also optimally placing the power supplies with respect to operational electrical safety and efficiency.

The lighting systems enable users to dynamically build a luminaire through a modular joining of individual light-emitting units, however such that risk of electrical failure is automatically prevented through a dynamic computation of electrical circuit properties and dynamic configuration of components. In particular, operational failure conditions are possible whereby a user may be subjected to a potential risk of shock. This challenge is further exacerbated where the light-emitting units are coupled with touch-sensitive interactive aspects (e.g., capacitive touch, pressure-sensitive touch), among others.

Embodiments described herein relate to improved circuits and systems relating to power control, optimal power supply placement, power control methods, configurable touch triggers, and controller circuit devices that are adapted for concealment (e.g., becoming visually indistinct relative to other light-emitting units). Additionally, lighting systems with granular and configurable touch sensing are described, wherein a user's interaction with the lighting system can be coupled to actuation of properties of the lighting system or of properties of other devices in communication with the lighting system. The spatial flexibility of the lighting system is adapted in some embodiments to address the aforementioned technical challenges.

A useful attribute is a configurable touch function. Since a lighting system takes up part of a surface, such as a wall, the lighting system, and its many distinct parts, can serve as multifunctional buttons. In smart home applications, for example, there is an increasing need to be able to receive input from the users of the space, and touch is a means to do so.

The benefit of this design is further amplified if the action associated with a particular manner of touch is not limited to alteration of the lighting system exclusively, but rather can extend to any configurable device in the smart home, be that a door lock, television, smartphone or coffee maker. Illustrative embodiments of applications of said lighting systems in smart home and gaming are provided.

It is not a straightforward implementation, however, and challenges have to be overcome with respect to setting up, managing, and executing the numerous functional associations, which as in the previous challenges, are further compounded by that the functionalities cannot be enumerated once and for all during manufacturing. The most basic aspects, like how to sense that a particular part of the lighting system has been touch in a particular manner, up to the intuitive definition of an association between touch and action, require efficient creation, communication and storage of data, as described in detail below.

In order to overcome all of the above technical challenges, computation is a key part. It is common to refer to the unit of a lighting system on which this computation is performed, the controller. Because the controller is functionally distinct from the units that generate light, the controller is typically visually distinct. It can be an obstacle to a desired design by the user to have to accommodate a visually distinct controller. An attractive design is therefore to integrate the functionally distinct components of the controller into a unit that generates light. This implies that at least one unit of the configurable lighting system must contain additional electronics that are constrained to a smaller space. Designs that overcome this are described in detail in some embodiments below, and include multi-layered circuit boards.

In a first aspect, a lighting system is provided that includes a controller including a processing unit (e.g., a microprocessor, a computer processor, a reduced instruction set processor), a computer memory (e.g., solid state storage, random access memory, read only memory), and one or a plurality of network interfaces (e.g., wireless interfaces, wired interfaces), one or more power supplies providing electrical power of a first magnitude, a plurality of light-emitting units; and a plurality of linkers, wherein a linker in the plurality of linkers conducts electrical current of a second magnitude. At least one light-emitting unit of the plurality of light-emitting units can be adapted to consume electrical power of a third magnitude, and create light emission of a fourth magnitude in accordance with an electro-optical relation.

The plurality of light-emitting units and the plurality of power supplies are coupled together by the plurality of linkers to establish an electrical network (e.g., electrical coupling through the flow of power between linkers and light-emitting units), such that at least one light-emitting unit of the lighting system draws the electrical power from the plurality of power supplies via a plurality of conductive pathways. Each conductive pathway cab be comprised of one linker or a plurality of linkers, and one light-emitting unit or a plurality of light-emitting units.

The controller is configured to set the plurality of third magnitudes, such that the plurality of first magnitudes is below a plurality of first power thresholds, the plurality of second magnitudes is below a plurality of second current thresholds, and the plurality of fourth magnitudes is equal to a target light emission, or if that is unattainable, equal to a plurality of reduced target light emissions.

In another aspect, the controller executes logical instructions on the processing unit, the logical instructions comprising machine interpretable instructions, which when executed by the processing unit of the controller, cause the processor to set the plurality of third magnitudes.

In another aspect, the controller receives the plurality of third magnitudes through a network interface coupled to an external device (e.g., a computer having a processing unit).

In another aspect, the plurality of first power thresholds is or about 24 Watts (e.g., 23 Watts, 25 Watts).

In another aspect, the plurality of second current thresholds is or about 2.5 Amperes (e.g., 2.4 Amperes, 2.6 Amperes).

In another aspect, the plurality of target light emissions is 100 Lumens of luminous flux of white light of correlated color temperature 6500 Kelvin.

In another aspect, the plurality of target light emissions is 650 milliwatts of radiant flux of red light.

In another aspect, the plurality of light-emitting units include 1-500 light-emitting units.

In another aspect, the plurality of reduced target light emissions is obtained by a multiplicative scaling of a plurality of target light emissions by a factor less than unity.

In another aspect, the light-emitting unit is a substantially flat luminaire.

In another aspect, the conductive pathway for a light-emitting unit is comprised of more than 10 linkers.

In another aspect, the controller is configured to set the plurality of third magnitudes substantially instantaneously when a light-emitting unit or when a power supply is coupled with a linker to a lighting system that is electrically powered.

In another aspect, the controller is configured to set the plurality of third magnitudes substantially instantaneously when a light-emitting unit or when a power supply is removed from a lighting system that is electrically powered.

In another aspect, a method for operating a plurality of light-emitting units is provided.

In another aspect, the plurality of light-emitting units are adapted to emit light colored according to a spectrum having a first end and a second end, such that when an additional power supply is coupled with a linker to a light-emitting unit emitting light colored near the first end of the spectrum rather than to a light-emitting unit emitting light colored near the second end of the spectrum, the controller increases a greatest value of a third magnitude or a plurality of third magnitudes such that the plurality of first magnitudes is below a plurality of first power thresholds, the plurality of second magnitudes is below a plurality of second current thresholds, and the plurality of fourth magnitudes is equal to a target light emission, or if that is unattainable, equal to a plurality of reduced target light emissions.

In another aspect, the spectrum is a linear interpolation of a RGB color model, wherein the first end of the spectrum is a white color, and wherein the second end of the spectrum is black.

In another aspect, the spectrum is a blue-green-red spectrum, wherein the first end of the spectrum is blue, and wherein the second end of the spectrum is red.

In another aspect, upon coupling of an additional power supply to a light-emitting unit of the lighting system such that the lighting system draws electrical power from a plurality of conductive pathways including the additional power supply, the color of the light emission is altered along the spectrum.

In another aspect, one or more additional power supplies are coupled to a light-emitting unit of the lighting system by a user until all light-emitting units emit light colored at the first end of the spectrum.

In another aspect, a method to set the power consumption of a plurality of light-emitting units includes determining, in a first computation, a plurality of electrical currents in the plurality of conductive pathways and a plurality of electrical powers in the plurality of power supplies that yield a plurality of electrical powers in the plurality of light-emitting units that corresponds to the plurality of target light emissions; and determining, in a second computation, a least reduction of the plurality of electrical powers for the plurality of light-emitting units, that yields no power supply in the plurality of power supplies providing electrical power above the first power threshold, and that yields no linker in the plurality of linkers conducting electrical current above the second current threshold.

In another aspect, the first computation is comprised of the steps: the selection of a first power supply, and the evaluation of the plurality of electrical powers and the plurality of electrical currents it provides to the plurality of light-emitting units and the plurality of linkers through the plurality of conductive pathways with a terminal at the first power supply; the addition of said plurality of electrical powers and the plurality of electrical currents to a data array indexed by the plurality of light-emitting units and the plurality of linkers; the repetition of the steps for selection of a power supply and addition to a data array until all power supplies in the plurality of power supplies have been selected once; the evaluation of the plurality of light emissions at the plurality of light-emitting units from the added values in the data array and in accordance with an electro-optical relation.

In another aspect, a lighting system comprising a controller, a plurality of light-emitting units, and a plurality of touch sensors is provided. The controller is comprised of a processing unit, a memory, and one or a plurality of network interfaces.

Each light-emitting unit in the plurality of light-emitting units is comprised of a plurality of components, which creates light emission, and a touch sensor is structurally contained within each light-emitting unit or the controller, and is configured to generate a sensory signal associated with a manner of touch adjacent to the light-emitting unit or the controller the touch sensor is structurally contained within, and to communicate the sensory signal to the controller. The controller stores in memory: a first data array representation of the physical arrangement of the light-emitting units and the controller, and a second data array representation of a plurality of mappings between a sensory signal at a physical position of the lighting system, and an action of a plurality of actions; wherein a third data array representation of a first action or a first plurality of actions is generated by the controller after a sensory signal or a plurality of sensory signals is communicated to the controller and matched with the first action or first plurality of actions in the plurality of mappings in the second data array. The data arrays can include different types of data object structures, including linked list data objects, array data objects, among others.

In another aspect, a lighting system is provided that includes a plurality of coupled light-emitting units, wherein each light-emitting unit of the plurality of coupled light emitting units includes of a housing defining a first spatial profile, said housing comprising: an output portion, and an interior portion, containing a first plurality of light emitters that creates light emission given electrical power in accordance with a relation.

The lighting system further includes a controller coupled to the plurality of coupled light-emitting units, wherein the controller includes of a housing defining a second spatial profile, said housing comprising: a controller output portion, and a controller interior portion, containing: a first plurality of light emitters that creates light emission given electrical power in accordance with a relation, and a second plurality of processor components that generates and transmits machine interpretable instructions to set a magnitude of electrical power drawn by a coupled light-emitting unit, or to set a plurality of magnitudes of electrical power drawn by a plurality of coupled light-emitting units, or to set the magnitude of electrical power drawn by the first plurality of components of the controller unit.

In another aspect, the first and second spatial profiles are squares.

In another aspect, the plurality of components of the controller interior portion are mounted on a Printed Circuit Board (PCB) with at least four conductive layers.

In another aspect, the plurality of processor components or the plurality of light emitters of the controller interior portion are mounted on a Printed Circuit Board (PCB) with at least four conductive layers.

In another aspect, the plurality of light emitters of the interior portion of the controller are mounted on a first Printed Circuit Board (PCB), wherein a second plurality of processor components of the interior portion of the controller are mounted on a second PCB, wherein the first PCB is connected to the second PCB and is physically positioned on top of the second PCB.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
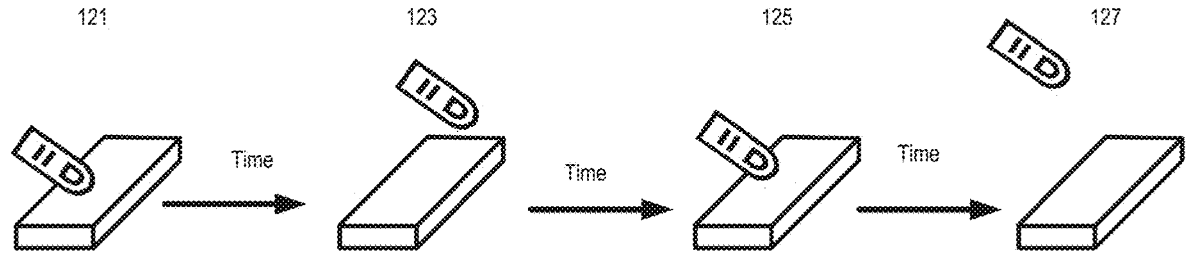
FIG. 1 illustrates a finger touching a light-emitting unit in a lighting system, such that the motion comprises a double tap with a finger manner of touch, according to some embodiments.

Applicant is an innovator in lighting and has invested considerable research and development resources into developing modular and configurable lighting solutions that are, in some configurations, capable of integration with smart-home control solutions. Applicants' LED lighting technologies, for example, have provided improved clean energy/technology solutions that reduce the overall carbon footprint and energy consumption, relative to some other lighting technologies.

Manufacturing lighting panels, especially those incorporating "green technologies" is technically challenging as there are different aspects to be taken into consideration. Manufacturing may only be practical at sufficient scale, for example, and limitations on manufacturing resources and/or power consumption may require improved approaches and structural configurations as described herein. LED lighting, in particular, if more widely adopted, can reduce overall power consumption relative to conventional lighting.

LED lighting can integrate with electronic components and software instructions executed on electronic components, such that the functional utility of LED lighting and LED-based luminaires can exceed that of other lighting technologies and luminaires. This capacity is especially potent for luminaires that deviate from standard form factors on the market, such as the A19, MR16, PAR30, PAR38 form factors.

The same electronic components can be used to execute software instructions that augment the lighting system with entertaining attributes. A lighting systems that can sense and respond to multimodal interactions by a user is especially apt for this, including gaming applications.

A functionally enhanced device can become more attractive to a user, and hence become more widely adopted, and consequently the adoption of "green technologies" can be accelerated through functional enhancements.

However, a greater functional capacity raises other design challenges. A profusion of options and possible ways to configure a device or service can create anxiety and dissatisfaction in a user, an observation referred to in psychology and behavioral economics as overchoice or the paradox of choice. Additionally, the greater number of possible configurations creates in turn a greater number of operational failure modes of a device, such as execution of faulty logical instructions, also known as a software bug, or electrical or mechanical malfunction as a device is configured in a way incompatible with the physical constraints of a component or a plurality of components of the device.

As described herein, embodiments relate to methods and devices that overcome the aforementioned challenges and deficiencies with respect to the creation and operation of lighting systems, lighting devices and luminaires that can afford to a space and its inhabitants a wide range of benefits.

There are a number of preferred variants described below, and Applicant notes that the features of the variants are not limited to the described variants, but combinations and permutations of the features of the variants are also contemplated.

Lighting System with Touch Function

In some embodiments, the lighting system is comprised of a plurality of independently configurable light-emitting units, and a controller. A light-emitting unit is at a minimum able to emit light of some optical quality when electrically powered. A controller is able to execute commands or software for the purpose of controlling the function of the lighting system, including, but not limited to, how the light-emitting units are electrically powered and thus the optical quality of the light they emit.

The controller is a computing device that is adapted for generating control signals based on processed, machine interpretable instructions (e.g., stored on non-transitory computer readable media).

The controller may be a modular physical unit having processors coupled thereon or residing therewith that execute the machine interpretable instructions to perform methods stored thereon.

In some embodiments, the lighting system is comprised of a plurality of independently configurable light-emitting units, a controller, and a power supply or a plurality of power supplies. A power supply provides electrical power to the lighting system needed for the function of the lighting system. A power supply can be limited in how much electrical power it can provide, therefore it can be practically necessary for a lighting system to be coupled to more than one power supply. A power supply can in turn be connected to an electrical power source, such as, but not limited to, an electrical wall socket, a battery or generator.

In some embodiments, the lighting system is comprised of a plurality of independently configurable light-emitting units, a controller, and a power supply or a plurality of power supplies, and a first plurality of linkers. A linker of said plurality can electrically couple pairs of light-emitting units, or it can electrically couple a controller to a light-emitting unit or a plurality of light-emitting units, or it can electrically couple a power supply to a light-emitting unit or a plurality of light-emitting units. The linkers can in other words be the physical structures (e.g., means) to distribute electrical power throughout the lighting system, from the plurality of power supplies to the plurality of light-emitting units.

In some embodiments, the lighting system is comprised of a plurality of independently configurable light-emitting units, a controller, and a power supply or a plurality of power supplies, and a second plurality of linkers.

A linker of said plurality can electrically and mechanically couple pairs of light-emitting units, or it can electrically and mechanically couple a controller to a light-emitting unit or a plurality of light-emitting units, or it can electrically and mechanically couple a power supply to a light-emitting unit or a plurality of light-emitting units. A linker can include a physical connector device having mechanical properties for connecting light-emitting units (e.g., being a joiner unit that is inserted into corresponding physical apertures of each light-emitting unit and having electrical wiring deposited thereon to allow for data or power transfer). In a specific embodiment, a linker is a small printed circuit board for joining two or more light-emitting units together.

The linkers can in other words be the means to distribute electrical power throughout the lighting system, from the plurality of power supplies to the plurality of light-emitting units, as well as be the means by which a plurality of light-emitting remain together as a single contiguous unit under moderate disruptive forces, such as gravity or bending, as well as be the means by which other parts of the lighting system are attached to the plurality of light-emitting units.

In some embodiments the light-emitting units are appreciably flat light-emitting diode (LED) lighting panels of a polygonal shape, such as but not limited to a square, triangle, hexagon, pentagon, rhomboid, or parallelogram. In some embodiments the light-emitting units are appreciably flat LED lighting panels of curved shaped, such as but not limited to a circle, semi-circle, ellipse, or crescent. In some embodiments the light-emitting units have an appreciably non-flat shape, that is an appreciable spatial depth, such as but not limited to a cube, parallelepiped, tetrahedron, octahedron, dodecahedron, icosahedron, sphere, or ellipsoid.

In some embodiments the light-emitting units can emit white light of a variable correlated color temperature (CCT). In some embodiments the light-emitting units can emit colored light, such as but not limited to, red, green, blue, or a mixture thereof, such as magenta, yellow, cyan, of a variable intensity.

In some embodiments the light-emitting units are comprised of electronic components not directly related to the creation or distribution of light. These electronic components can include electronic components to sense a static or dynamic condition or property of the environment to a light-emitting unit or a plurality of light-emitting units. In some embodiments these static or dynamic conditions or properties include a manner of touch.

In some embodiments a manner of touch is comprised of a user pressing a finger against a light-emitting unit. In illustrative embodiments, a plurality of light-emitting units is installed on a wall, the light-emitting surfaces facing outwards towards the space. In said space a user can reach out and with the tip of the finger touch the light-emitting surface of one of the light-emitting units. The pressing of a finger against a light-emitting unit can be a static condition in that its duration is not functionally relevant. The pressing of a finger against a light-emitting unit can however be defined such that the duration of touch must exceed a threshold in order to register as a particular event of pressing. The threshold can be, but is not limited to, 50 milliseconds, 125 milliseconds, 500 milliseconds.

In some embodiments a manner of touch is comprised of a user tapping a sequence against a light-emitting unit with the finger. The single tap can be comprised of a physical contact between finger and light-emitting unit for less than 1 second, less than 500 milliseconds, less than 125 milliseconds. A tap is therefore a dynamic condition that depends on duration of touch. The dynamic nature of this manner of touch means more complex sequences of tapping can be contemplated.

The double tap, illustrated in FIG. 1, can be comprised of a first physical contact 121 between finger and light-emitting unit for less than 1 second, less than 500 milliseconds, less than 125 milliseconds, followed by a short duration absent any physical contact 123 between finger and light-emitting unit for less than 1 second, less than 500 milliseconds, less than 125 milliseconds, followed by a second physical contact 125 between finger and light-emitting unit for less than 1 second, less than 500 milliseconds, less than 125 milliseconds, then finally absence of physical contact 127. This manner of touch can be recursively extended to also include triple tap, quadruple tap and so on. In preferred embodiments, higher-order taps above a double tap are not used since they can be functionally too complicated for a user to manage.

In other embodiments the manner of touch is comprised of a user moving the finger in a direction across the light-emitting surface, while maintaining physical contact with the light-emitting surface. This manner of touch is a swiping motion and can be called a swipe. The swipe is comprised of spatial variation.

Therefore, a swipe can have both duration and direction. In other words, a swipe can be denoted as a rapid upward swipe, a rapid rightward swipe, a slow downward swipe, a slow upward-rightward diagonal swipe, and so on. In embodiments wherein the light-emitting unit is comprised of an appreciably flat surface, the spatial component can be decomposed into motion along two orthogonal directions relative the appreciably flat surface.

In other embodiments the manner of touch is comprised of a user moving the finger in an appreciably closed curve over the light-emitting surface. The closed curve can be, but is not limited to, a circle or ellipsoid. The curve can be traced with the finger in a clockwise or counter-clockwise direction. The duration of tracing the curve can be another property of the manner of touch that is functionally relevant.

In other embodiments the manner of touch is comprised of a user applying two or more fingers to the pressing, tapping, swiping or closed curve motion. The separation between the two fingers can exceed a threshold in order for the manner of touch to be differentiated from pressing, tapping, swiping or closed curve motion with a single finger. The threshold for the separation can be 1 centimeter, 2 centimeters, 3 centimeters.

In other embodiments the manner of touch is comprised of a user moving two fingers towards each other in a pinching motion, or apart from each other in a spreading motion. The pinching and spreading motions relate to spatial variation of the touch, and can therefore be subject to thresholds of duration and finger separation as in the manners of touch described above.

In other embodiments the manner of touch is comprised of the palm of a hand touching a light-emitting unit. The larger surface area between the user and the lighting system thus formed can be associated with additional functionality distinct from the manner of touch involving a finger or a plurality of fingers. As with the manner of touch involving a finger, the palm can be used to press, tap, swipe, or trace a closed curve on the light-emitting surface. The speed at which the palm is moved across the surface, or the duration of the physical contact, are therefore possible properties that can enable a range of manners of touch.

Figure 2:
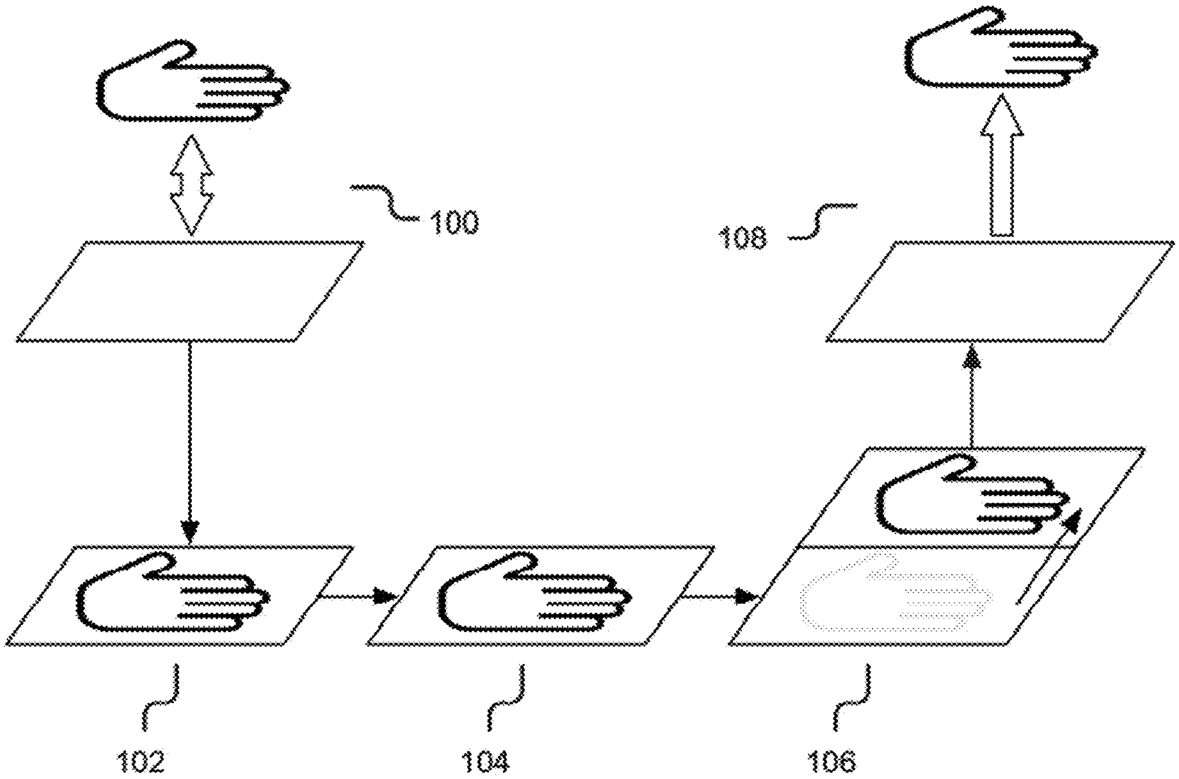
FIG. 2 illustrates a palm of a hand touching and moving relative a first and a second light-emitting unit in a lighting system, such that the motion comprises a swipe with a palm manner of touch, according to some embodiments.

In FIG. 2, an illustrative sequence of a hand swiping across two light-emitting units is shown. The hand approaches 100 a first light-emitting unit, then touches 102 the first light-emitting unit, then remains in contact for a duration of time 104 with the first light-emitting unit, then motions across the lighting system 106 to an adjacent second light-emitting unit, then finally removes the hand from contact 108 with the second light-emitting unit and the lighting system as a whole.

In other embodiments the manner of touch involves physical contact with a plurality of light-emitting units. In an illustrative embodiment a user performs a single tap on one light-emitting unit of the lighting system installed on a wall, followed by a single tap on another light-emitting unit of the lighting system installed on a wall.

Rather than said sequence of touching the lighting system being simply two consecutive single taps, as described above, this manner of touch can be uniquely labelled as long as the duration between the two single taps is below a threshold. In a lighting system comprised of four light-emitting units, there are twelve unique ways that two distinct light-emitting units can be tapped in such a sequence. In a lighting system comprised of ten light-emitting units, there are ninety unique ways two distinct light-emitting units can be tapped in such a sequence. As additional light-emitting units are added to the plurality of light-emitting units comprising the lighting system, the number of unique manners of touch involving two or more light-emitting units can increase in a combinatorial fashion.

In other illustrative embodiments the manner of touch involves physical contact with a plurality of light-emitting units, in which the finger of palm is swiped across two or more adjacent light-emitting units. The direction of the swipe, the length it covers, the duration it lasts, and the speed at which it takes place, can all be features of this manner of touch.

The illustrative examples above of sensing of a manner of touch are described with respect to fingers and palms, but are not limited to these instruments of contact. Other means of forming a physical contact between one or a plurality of light-emitting units with an external object can be contemplated. In some embodiments this can be pen-like objects for which the points of contact with the light-emitting unit are comprised of the apex of the objects. In some embodiments this can be a finger or palm wrapped in a fabric, like a glove. In some embodiments this can be a prosthetic limb or a component thereof. In some embodiments this can be a toe and foot. Other human appendages can be contemplated.

The descriptions above of illustrative examples of manner of touch is by way of example and is non-limiting.

Figure 3:
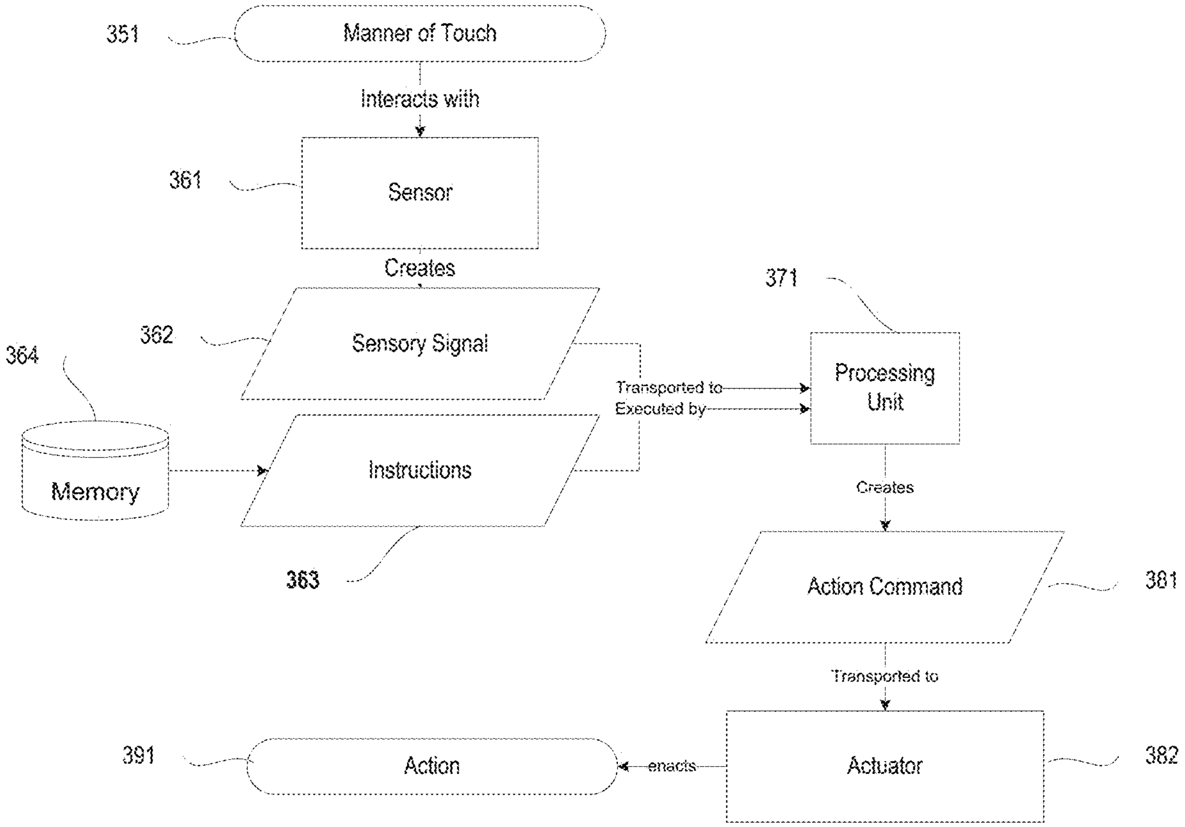
FIG. 3 illustrates a process of associating a manner of touch with an action; the flow-chart uses ellipse to denote an event or a modality, rectangle to denote an object, and parallelogram to denote data or a data array, according to some embodiments.

In order to practically implement light-emitting units and lighting systems able to sense one or a plurality of manners of touch, such as but not limited to the ones described above, the following method can be implemented, illustrated in FIG. 3:

(1) The manner of touch 351 interacts with a sensor 361, thus modifying one structural or functional feature, or a plurality of structural or functional features of the sensor.

(2) The modification of said feature or plurality of features creates a sensory signal 362 that in turn can be represented as a first data array.

(3) The first data array can be received by, or transported to, a processing unit 371 or a plurality of processing units, the processing unit can be part of the light-emitting unit, or it can be part of a unit other than a light-emitting unit.

(4) The first array can be transformed into a second data array through the execution of a set of logical instructions 363 on the processing unit or the plurality of processing units. The execution can also access a digital memory 364 that stores additional data arrays.

(5) The second data array can embody an instruction or command 381 to execute some action 391, either at an actuator 382 part of the lighting system, or at an actuator at some other location, but configured such that the second data array can be transported to the other location. In this way the manner of touch 351 leads to, or is associated with, the action 391.

The steps outline the function of a sensor-actuator network. Some embodiments pertain to steps 2, 3 and 4, and systems that embody functionality by virtue of these steps of the method, as further described below.

A great number of technologies has been disclosed that relate to the first step in the enumerated method steps. So-called smartphone technology, touchscreens and touch-panels in particular, are instructive with respect to this. The chapter *Touch Sensing* by Walker, part of the anthology *Interactive Displays: Natural Human-Interface Technologies*, edited by Bhowmik, published in 2014, provides detailed descriptions of technology that can be used in order to implement the first step. The webpage titled *Touch Sensing Technology for Human Interface Designs* by Digi-Key provides additional references to circuits that can implement the first step (https://www.digikey.com/en/articles/techzone/2012/feb/touch-sensing-technology-for-human-interface-designs).

A non-limiting list of touch-sensing technologies that can be part of the first step are: Capacitive sensing, resistive sensing, optical sensing, acoustic sensing, force sensing. Properties of the sensor, such as cost and size, and if it reduces the light output from the light-emitting unit, can be considered in the choice of a practical implementation.

With respect to the second step, the manner of touch can be represented as a data array. The data array can embody properties of the manner of touch, at a given instance in time, such as but not limited to, which light-emitting unit in the plurality of light-emitting units that is touched, where on said light-emitting unit the touch is applied, the size of the touching object, how firmly the touching object is pressed against the light-emitting unit. Two appreciably distinct manners of touch can therefore correspond to two distinct data arrays.

In some embodiments it can be desirable that as any two light-emitting units in the plurality of light-emitting units comprising the lighting system, are touched in appreciably identical manners, the data arrays the respective light-emitting units generate, are identical. Because the sensor technology can be influenced by variable properties of the space in which the lighting system is installed, the baseline values of the plurality of touch sensors can vary between installations and within a lighting system installation.

For example, one light-emitting unit may have copper pipes or metal nails that would otherwise register a touch sensor signal that does not represent a true user interaction. Since the baseline cannot be determined once and for all during manufacturing, it can rather be defined as the most common sensor read-out in a particular installation of the lighting system. This baseline is then continuously subtracted from the real-time sensor value by the execution of logic instructions inside the light-emitting unit, such that the output data array representing the manner of touch is consistent across the lighting system.

As described above, a manner of touch can be dynamic. For example, a double tap is not a property that can be derived entirely from the read-out from a touch sensor or a plurality of touch sensors at a single point in time. A double tap can be identified as a sequence of touch sensor read-outs satisfying certain criteria corresponding to, for example, duration and size thresholds.

For example, as a finger initially touches a light-emitting unit, a first data array is created indicating a contact of this kind. Within a time threshold the finger ceases to be in contact with said light-emitting unit, and a second data array is created indicating absence of contact. Within a time threshold a finger again touches the light-emitting unit, a third data array is created indicating a contact of this kind.

Within a time threshold the finger ceases to be in contact with said light-emitting unit and no touch is resumed within another time threshold, and a fourth data array is created indicating this absence of contact. The sequence of the first, second, third and fourth data arrays comprises the aggregate sensory signal that can be associated with the double tap manner of touch. In some embodiments the aggregation is performed within the sensor. In some embodiments the aggregation is performed at a different part of the lighting system. In either case the double tap manner of touch can be associated with a sensory signal, which in turn can be associated with a data array.

The swipe manner of touch is like the double tap not a property that can be derived entirely from the read-out from a touch sensor or a plurality of touch sensors at a single point in time. For example, as a finger initially touches a light-emitting unit, a first data array is created indicating a contact of this kind. Within a time threshold the finger is in contact with said light-emitting unit however in a different location on the light-emitting unit, and a second data array is created indicating a contact of this kind.

Further changes to the location of the contact with the finger creates a sequence of data arrays, until the finger ceases to be in contact with said light-emitting unit, and a final data array is created indicating absence of contact. The sequence of the first, second, up until the final data arrays comprises the aggregate sensory signal that can be associated with the swipe manner of touch. In some embodiments the aggregation is performed within the sensor. In some embodiments the aggregation is performed at a different part of the lighting system. In either case the swipe manner of touch can be associated with a sensory signal, which in turn can be associated with a data array.

The swipe manner of touch that involves a plurality of light-emitting units is not a property that can be derived entirely from the read-out from a touch sensor or a plurality of touch sensors at a single point in time. For example, as a finger initially touches a first light-emitting unit, a first data array is created indicating a contact of this kind. Within a time threshold the finger is in contact with a second light-emitting unit, wherein first and second light-emitting units are adjacent within the physical arrangement of the lighting system, and a second data array is created indicating a contact of this kind.

Further changes to the location of the contact with the finger creates a sequence of data arrays, until the finger ceases to be in contact with any light-emitting unit, and a final data array is created indicating absence of contact. The sequence of the first, second, up until the final data arrays comprises the aggregate sensory signal that can be associated with the swipe manner of touch.

In some embodiments, each light-emitting unit is associated with a data array that represents the manner of touch the light-emitting unit is experiencing. The data array can be stored in a memory that is contained within the light-emitting unit. The data array can be stored in a memory on a separate device, which is able to at least receive data arrays from the light-emitting units.

In some embodiments, the separate device is a controller coupled to the plurality of light-emitting units. The data array can be created by the controller polling each light-emitting unit with respect to the manner of touch each light-emitting unit is experiencing. This can be implemented as a communication of data arrays between the controller and the plurality of light-emitting units via a plurality of connections.

Methods of transporting data arrays can be used for the communication of the data arrays. In some embodiments the plurality of connections to the controller are of a structure like a network of tree topology. In these embodiments efficient data array transport methods can be used, such as the method disclosed in a Patent Application published as WO2019134046. This application is incorporated herein by reference.

In some embodiments, there can exist a mapping or a plurality of mappings between the manner of touch and an actuation of the lighting system, or an actuation of a secondary device, not part of the lighting system. The mapping or the plurality of mappings can be embodied as a data array stored in the memory of the controller. The data array can be understood as a dictionary, with a sensory signal, or its associated data array, as the key, and with a specification of an actuation, or its associated data array, as the value.

In these embodiments, the controller executes logical instructions that creates a second data array given a first data array or a first plurality of data arrays received from the light-emitting units representing the manner of touch. The second data array in these embodiments can subsequently be transported to a light-emitting unit or a plurality of light-emitting units in the lighting system, and once received by said light-emitting unit or said plurality of light-emitting units, be consumed and in turn trigger an action at said light-emitting unit or said plurality of light-emitting units.

Said action at a light-emitting unit or a plurality of light-emitting units can be, switching on all light-emitting units of the lighting system, such that they emit plenty of light and illuminate the space in which the lighting system is installed. Other actions can be, switching off all light-emitting units of the lighting system. Other actions can be, changing color of the emitted light from the particular light-emitting unit at which the manner of touch took place. Other actions at a light-emitting unit or a plurality of light-emitting units can be contemplated.

In other embodiments, the controller executes logical instructions that creates a second data array given a first data array or a first plurality of data arrays received from the light-emitting units representing the manner of touch. The second data array in these embodiments can subsequently be transported to a secondary device, not part of the lighting system, however coupled to the controller, such that data arrays can be communicated between controller and secondary device. The secondary device can in these embodiments consume the second data array and be actuated.

In these embodiments, the mapping therefore specifies which creation of a second data array from a plurality of possible second data arrays, to execute, given a first data array representing the manner of touch.

The transport of the second data array can be done by the same means and methods as the transport of the first data array from the lighting units to the controller. The transport of the second data array can be done by other means and methods. Illustrative methods include: transport via a wire or serial port using the Ethernet protocol, or a Point-to-Point protocol, transport via wireless electromagnetic radiation using Wi-Fi™, Bluetooth™, Zigbee™, Z-Wave™, 6LowPAN™, 4G or 5G technology.

Illustrative embodiments of these types of manner of touch to action associations include:

(1) A single tap can be associated with interesting temporary or permanent visual outputs for different touch types or some combination thereof. Especially for light-emitting units that can emit colored light, the visual outputs can be made very noticeable and inviting to tactile interaction between user and lighting system.

(2) Manners of touch can be configured to control the overall system light output, for example by having a double tap toggle the system output on or off, or having a swipe change the brightness up or down depending on the direction of the swipe across the surface of a light-emitting unit.

(3) The manner of touch can be associated with a data array required by a record-player or loudspeakers to initiate the playing of music, wherein the exact tune to initiate can depend on which light-emitting unit in the plurality of light-emitting units that is touched. (4) The manner of touch can be associated with a data array required by a remote controlled door lock to temporarily unlock, such that the lock remains unlocked for the entire duration of a particular light-emitting unit being pressed.

In particular for embodiments wherein the second data array is transported to a secondary device, the data arrays can be required to conform to a certain structure in order to be interpreted as intended by the secondary device. So-called smart home protocols and standard Application Programming Interfaces (APIs) serve this purpose and can greatly expand the kinds of actions a manner of touch therefore can be associated with. The approach of some embodiments can be combined with these, including but not limited to, HomeKit™, Alexa™, Google Assistant™, SmartThings™, Nest™, Samsung Connect™, Hive™, Yonomi™'

Lighting System with Touch as Game

In other embodiments, the actuation mapping specifies given a manner of touch can constitute a game or part of a game, intended for entertainment. In some embodiments the game is rendered with the light-emitting panels of the lighting system. In other embodiments the game is rendered on a secondary device and the lighting system provides additional means for input and output to the game. The two types of game embodiments are described next.

Especially for embodiments wherein the light-emitting units are spatially arranged in relation to each other along a grid, the light-emitting units can be used as pixels that can create an appearance of moving objects. At a given instance in time, a first light-emitting unit can emit light of a color distinct from the other light-emitting units in the plurality of light-emitting units of the lighting system.

For example, the first light-emitting unit can be of a red color, while the other light-emitting units can be of a blue color. In the next instance in time, a second light-emitting unit adjacent to the first light-emitting unit can change color from blue to red, as the first light-emitting unit can change from red to blue. As this sequence of transformations continues in time, the appearance of a moving red object on a blue background is created.

The rules that govern the transformation of the colors the light-emitting units emit between instances in time can be a function of the manner of touch. The apparent moving red object in the illustrative embodiment can therefore be governed by a user's tactile interaction with the lighting system.

Figure 4:
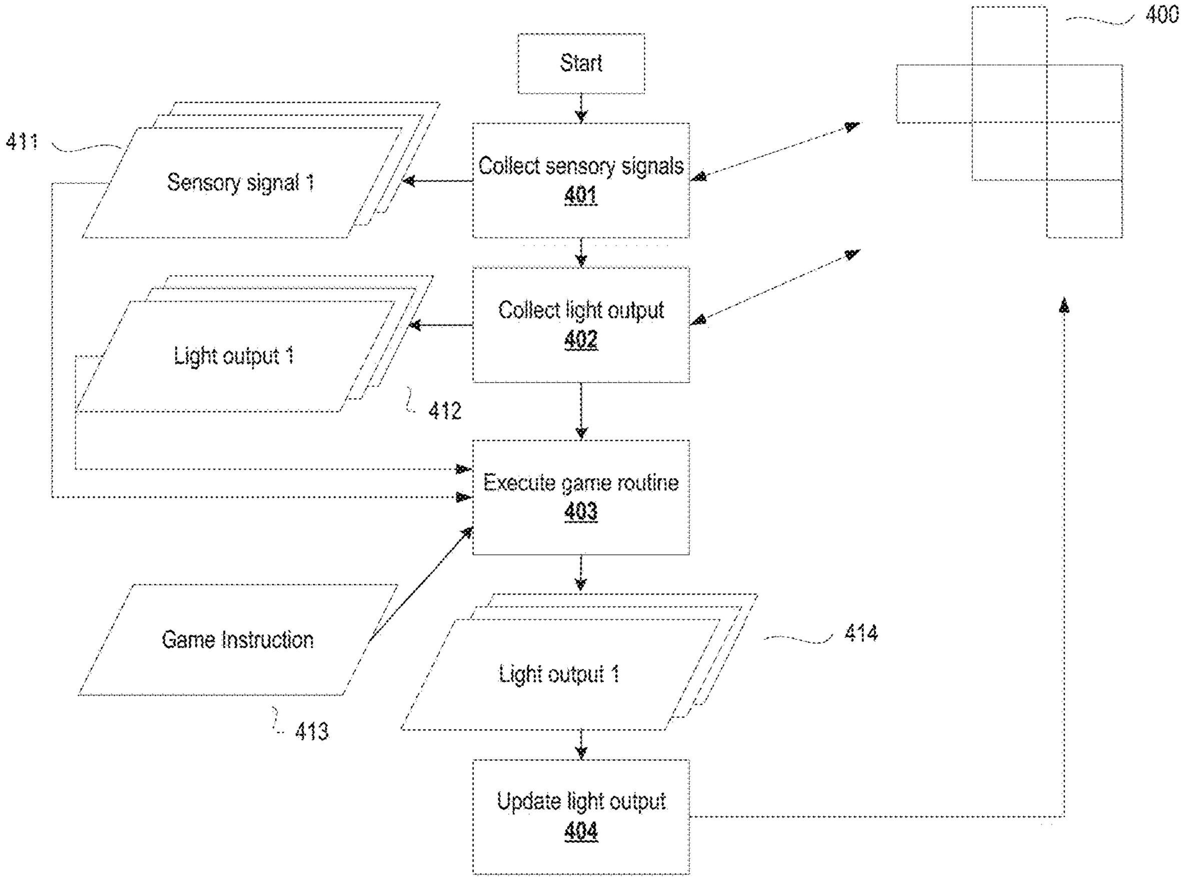
FIG. 4 illustrates a process executed by a controller of a lighting system in order to create a gaming experience involving touch and light output, according to some embodiments.

In an illustrative embodiment, shown in FIG. 4, several modular light-emitting units in the shape of squares are connected together 400, each with touch sensor inputs. The touch sensor input can use one of the methods described above. The controller of the lighting system is loaded with a game program 413, which upon execution by a processing unit of the controller brings about the game experience and its rules. As part of said execution, the controller continually collects the sensory signals 401 from the light-emitting units 400 and represents any sensed manner of touch as a first plurality of data arrays 411.

The collection of sensory signals can occur at some frequency, such as once every 1 millisecond, once every 10 milliseconds, or once every 100 milliseconds. The more frequent collection of touch events enables a more rapid response between a manner of touch and a game variation, however it can require more computing to take place by the controller, which can require more expensive components.

The first plurality of data arrays 411 for a given time instance is used as input to the logic instructions of the game. A second plurality of data arrays 412 that represents the lighting output state of each light-emitting unit in the lighting system is available to the controller as well. In the illustrative embodiment these are collected 402 from communication with the plurality of light-emitting units, though embodiments where the second plurality of data arrays 412 are retrieved from memory can be contemplated.

The controller can proceed to execute 403 a game instruction 413 taking at least the first plurality of data arrays 411 as input, and optionally the second plurality of data arrays 412 as input. A third plurality of data arrays 414 is obtained, which represents a light output. The light output of the plurality of light-emitting units of the lighting system can be duly updated 404. The third data array is consumed by one light-emitting unit, or a plurality of light-emitting units, and the visible light outputs are updated. After these steps of the method, the execution repeats, that is the manner of touch of the light-emitting units are sensed.

Games such as Whac-A-Mole™, Conway's Game of Life™, Pacman™, Twister™, Blockade™ or other Snakes™ games, are some games that can be implemented using the method illustrated above. These games can associate the user's touching of the light-emitting units to a light output for entertainment. Other games can be contemplated.

In some embodiments, a score can be shown to the user. In one embodiment of a scoring mechanism the dynamic modular layout is filled in a given direction based on the detected spatial positions of its modular lighting units.

In embodiments wherein the lighting system is comprised of a plurality of light-emitting units that can be coupled together in a plurality of different spatial arrangements or layouts, the interactive games can be rendered on more complex structures than the conventional rectangular computer screen. Furthermore, in some embodiments the controller is continually checking the layout of light-emitting units and changes to it. In these embodiments a user can add or remove a light-emitting unit while the lighting system is electrically powered and the logic instructions of the game are being executed as described above. The playing field is in these embodiments variable and can be a feature of the interactive game.

The games described so far involve the lighting system only. In some embodiments the lighting system can send data arrays to a secondary device, and can receive data arrays from a secondary device, such that additional game experiences can be created. The secondary device can be a computer system, which executes logical instructions of a game that is in part embodied as light and sound on a screen, such as a television screen, computer screen, smartphone, home entertainment screen.

In some embodiments, the controller executes logical instructions that creates a second data array given a first data array or a first plurality of data arrays received from the light-emitting units representing the manners of touch. The second data array can in some embodiments be transported to a secondary device, not part of the lighting system, however coupled to the controller, such that data arrays can be transported between controller and secondary device. The secondary device can in such embodiments consume the second data array and generate an action within the context of the computer game. Consequently, a manner of touch can be associated with an action in the game rendered on the secondary device.

The transport of the second data array can be done by the same means and methods as the transport of the first data array from the lighting units to the controller. The transport of the second data array can be done by other means and methods.

Illustrative methods include: transport via a wire or serial port using the Ethernet protocol, or a Point-to-Point protocol, transport via wireless electromagnetic radiation using Wi-Fi™, Bluetooth™, Zigbee™, Z-Wave™, 6LowPAN™, 4G or 5G technology.

In illustrative embodiments, a tap on a light-emitting unit in the lighting system that is emitting a distinctly colored light from the other light-emitting units, makes a rendered creature in a game shown on the secondary device jump over an obstacle. If the tap on the particular light-emitting unit following a switch in its emitted color, is not sensed within a time-limit, the creature in the game fails to clear the obstacle and the game terminates. In other illustrative embodiments, a simultaneous downward swipe across the surface of two light-emitting units emitting a distinctly colored light from the other light-emitting units, makes a rendered creature in a game shown on the secondary device throw a rendered ball in the game such that its trajectory arcs as if the ball is experiencing the Magnus effect.

Other actions within a game governed by a timed or non-timed manner of touch of a particular light-emitting unit or a plurality of light-emitting units of the lighting system can be contemplated. A greater number of light-emitting units in the plurality of light-emitting units of the lighting system, as well as a greater number of distinct manners of touch that can be sensed, the greater the number of game actions can be governed through a manner of touch relative the lighting system, and the creation and transport of data arrays within the lighting system and between the lighting system and the secondary device.

The connection between the game on the secondary device and the lighting system can be the other way around. That is, an action of event within the game can generate a first data array that is communicated to the controller. The transport of the first data array to the controller can be done by methods such as: transport via a wire or serial port using the Ethernet protocol, or a Point-to-Point protocol, transport via wireless electromagnetic radiation using the Wi-Fi™, Bluetooth™, Zigbee™, Z-Wave™, 6LowPAN™, 4G or 5G technology.

The controller receives the first data array, and the controller evaluates an association between the first data array and a second data array. The second data array is transported to a light-emitting unit or a plurality of light-emitting units in the lighting system. Methods of transporting data arrays can be used in order to transmit the second data array from the controller to the light-emitting units. In some embodiments the plurality of connections to the controller are of a structure like a network of tree topology.

In these embodiments efficient data array transport methods can be used, such as the method disclosed in Patent Publication WO2019134046. This application is incorporated herein by reference.

Once the second data array is received and consumed by the light-emitting unit or the plurality of light-emitting units, the light output of the light-emitting unit or the plurality of light-emitting units changes as instructed by the second data array.

In illustrative embodiments, the termination of a rendered creature in a game shown on the secondary device leads to a rapid change of light output from the lighting system to an intense red. This switch amplifies the immersive experience of the game. In other illustrative embodiments, the critical competitive event within the game leads to a rapid switching of light output, such that the user of the game is experiencing additional excitement and engagement with the critical competitive event. Other associations between game events and light output from the lighting system can be contemplated.

The games described so far involve one lighting system and in some embodiments a secondary device in communication with the lighting system. In other embodiments the game experience involves a plurality of lighting systems in communication with each other. The secondary device in the previous embodiments can be a controller of a second lighting system installed in a separate space from the first lighting system.

A first controller connected to the Internet can therefore communicate with a second controller a significant distance away from the first controller. The distance can be less than a kilometer within a common residential neighborhood, or within a common stadium of conference hall. The distance can be less than 2,800 miles between a plurality of lighting systems on different coasts of the United States of America. The distance can be less than 21,000 kilometers between a plurality of lighting systems anywhere on the Earth.

Lighting System with Configurable Touch-Action Association

The methods and systems described above can employ a mapping in order to associate a manner of touch with an action, or they can employ a mapping in order to associate an action with a type of light emission. As described the manner of touch can cover a wide range of types of interactions. As described the action can cover a wide range of types, such as real-world actions through an actuator or plurality of actuators, or such as the creation or transformation of data arrays stored in a memory, or such as the creation or transformation of data arrays that can be rendered as changes to a gaming environment shown on a secondary screen. The association between input and output is in part determined by logical instructions executed on a processor unit of the controller. The logical instructions as a whole can be called the control software.

In some embodiments the control software is configurable by the user of the lighting system. The control software can be comprised of logical instructions, such as conditional statements, loops, declarative statements, arithmetic operations, and so on. The control software can be embodied as data arrays that can be stored in a memory, such as a digital memory part of the controller of a lighting system. The control software translates into associations and actions, as described above in illustrative embodiments, when executed by the processing unit part of the controller of a lighting system.

In embodiments of the lighting system, wherein the lighting system can communicate data arrays with a secondary device, the data arrays comprising the control software can be altered after installation of the lighting system. The transport of the data arrays comprising the control software to the controller can be done by methods such as: transport via a wire or serial port using the Ethernet protocol, or a Point-to-Point protocol, transport via wireless electromagnetic radiation using the Wi-Fi™, Bluetooth™, Zigbee™, Z-Wave™, 6LowPAN™, 4G or 5G technology.

The steps of this method can be part of mechanisms of software updates that are used for computers, smartphones, and low-power devices. The methods of software updates have to manage security as well, such that only authenticated control software updates are allowed. Methods include, but are not limited to, the ones described in U.S. Pat. No. 6,594,723B1, U.S. Pat. No. 9,639,347B2, and in Authenticated Software Update by Ye from 2008 and in Update Embedded Device Software Securely Using These Strategies by Wakes from 2017 (https://www.fierceelectronics.com/embedded/update-embedded-device-software-securely-using-these-strategies).

With a method to update the control software, the user can on a secondary device, such as a computer or smartphone, provide instructions that in turn creates a data array that is used to securely update the control software stored on the controller.

The user interface on the secondary device can be designed to be easy to use, such that the user is not required to directly create the content of the data array. The instructions provided by the user can in these embodiments be comprised of pressing virtual buttons, sliding virtual dials and rudimentary numerical input. These instructions create a data array that by the means described above updates the control software on the controller of the lighting system.

In embodiments pertaining to smart home functionality, wherein a manner of touch at one light-emitting unit or a plurality of light-emitting units of the lighting system, is associated with an action pertaining to the light output of the lighting system, or pertaining to another device, such as a remote controlled door lock or connected loudspeakers, the enablement of the user to alter the associations through a simple interface, such as a smartphone or other device with a graphical interface, expands the possible options the user can implement to serve the user's specific needs.

Residential spaces, commercial spaces, and other indoor spaces inhabited by humans, can be of a diverse layouts, such as different number of doors, different number of windows, different kitchen equipment, and different home entertainment systems. Inhabitants of said spaces can have different needs given their abilities and predispositions, such as cognitive impairment, reduced vision, limited mobility, and affinity to expressive colors. After the initial installation of the lighting system in the space, the configuration of the control software through a simple user interface can make the lighting system function as a hardware platform onto which a vast collection of tailored applications are loaded and made actual.

Figure 5:
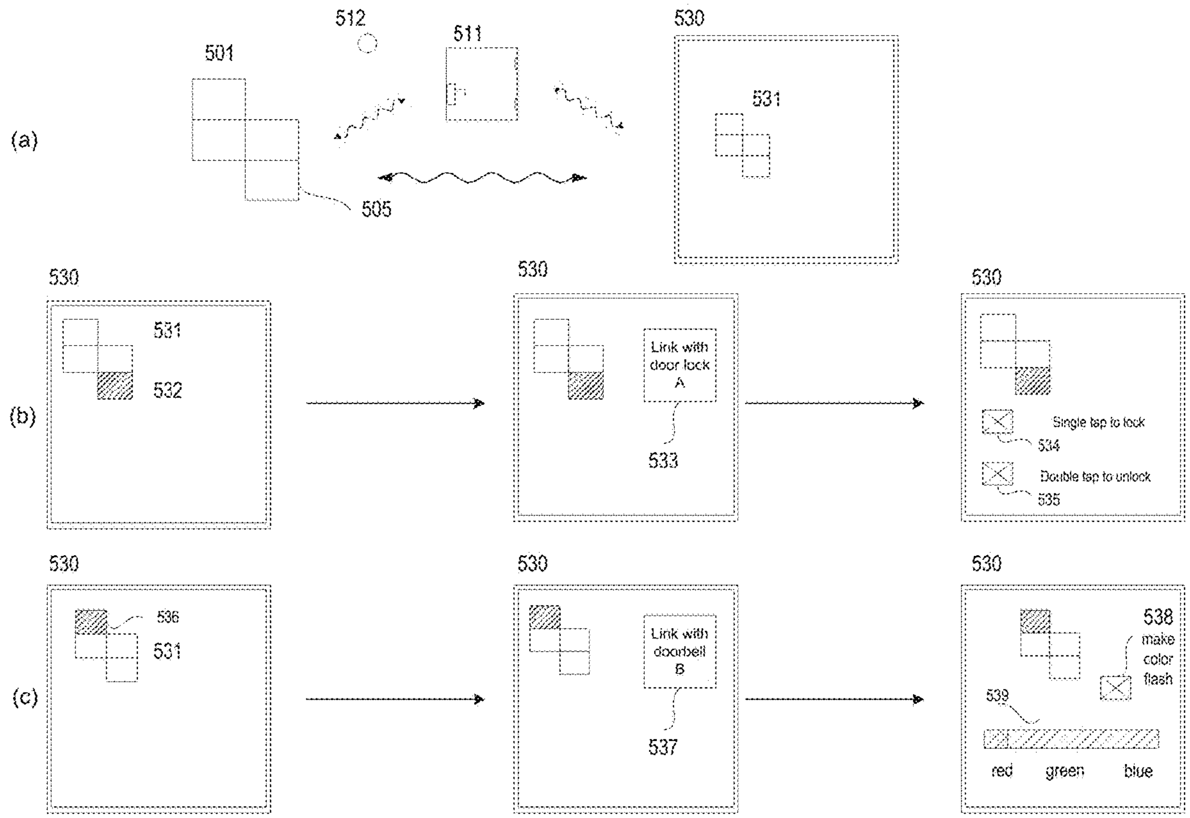
FIG. 5 illustrates in FIG. 5(*a*) an installation of a lighting system on a wall in a space also equipped with a door with a door lock and doorbell, wherein the lighting system is represented graphically on a separate device, such as a smartphone; the steps to configure linkings between sensory signal and actuation commands are also illustrated in FIG. 5(*b*) and FIG. 5(*c*), according to some embodiments.

In an illustrative embodiment of the lighting system, shown in FIG. 5, the following scenario can take place. A lighting system 501 has been installed on a wall in a living room. The lighting system is comprised of a plurality of light-emitting units, that together occupy a certain area of the wall. The light-emitting units are joined to a controller, which is comprised of at least a memory, a processing unit, a first network interface that can communicate data arrays between the plurality of light-emitting units and the other controller components, and a second network interface 505 that can communicate data arrays between secondary devices and the other controller components. In illustrative embodiments the secondary device is a smartphone with a graphical user-interface 530.

The layout of the lighting system is represented on the graphical user-interface as 531 on the secondary device, such that a user can refer to individual light-emitting units of the lighting system through interactions with the graphical representation on the secondary device. In illustrative embodiments, this involves touching light-emitting unit representations with a finger on a smartphone.

In the illustrative embodiment, there is a door with a door lock 511 and a doorbell 512 in the same dwelling or space as the living room with the lighting system. Both the door lock and the doorbell are comprised of components that can enable them to communicate data arrays with either the lighting system 501, the secondary device 530, or a common router, such as a home Wi-Fi router. The relevant quality of the illustrative embodiment is that the lighting system and the door lock and doorbell are coupled directly or indirectly.

Through the user interface of the secondary device 530, the user can reference a first light-emitting unit 532. In the scenario of the illustrative embodiment, a first light-emitting unit 532 has been referenced. In the graphical user interface, a first list of options 533 becomes available. The list can be presented as a drop-down menu. In the first list the user selects an option, such as "link with door lock A". In the graphical user interface, a first set of options becomes available. The first set can be presented as a list of selectable options. In the list the user selects two options, such as "single tap to lock" 534 and "double tap to unlock" 535.

In a similar manner the user can reference a second light-emitting unit 536. In the scenario of the illustrative embodiment, a second light-emitting unit 536 has been referenced following the previous steps pertaining to the first light-emitting unit 532. In the graphical user interface, a second list of options 537 becomes available. The list can be presented as a drop-down menu and it can be identical to the first list of options 533. In the second list the user selects an option, other than for the first light-emitting unit, such as "link with doorbell B". In the graphical user interface, a second set of options becomes available. The second set can be presented as a list of selectable options. In the list the user selects an option, other than for the first light-emitting unit, such as "make color flash" 538. In the graphical user interface, a color spectrum is represented 539. The user selects a color from said spectrum, such as a bright red color.

At this stage in the illustrative scenario, three associations have been defined, involving two specific light-emitting units, a door lock named "A" and a doorbell named "B". A first data array that embodies said definitions are created by the secondary device and sent to the controller through its second network interface. The controller interprets the first data array through execution of a first plurality of logic instructions. The interpretation is comprised of:

(1) An identification of which two light-emitting units of the lighting system that the user have referenced through the user interface of the secondary device. The controller can have the layout of the lighting system stored in memory, from which the identity is retrieved, such that logical instructions to be executed by the controller can include selective communication of data arrays to and from said light-emitting units.

(2) An identification of which secondary devices are referenced through the lists in the user interface of the secondary device. The controller can have a dictionary of named secondary devices and network identifiers in memory, such that logical instructions to be executed by the controller can include selective communication of data arrays to and from said secondary devices. The controller can at this stage further prefix the communication with said secondary devices with the necessary data required by the common smart-home protocols of the controller and the secondary devices, such as but not limited to the protocols for HomeKit™, Alexa™, Google Assistant™, SmartThings™, Nest™, Samsung Connect™, Yonomi™.

(3) The controller generates a second data array, which comprises the control software, and stores it in memory. Upon execution by the controller, the control software monitors the sensory inputs, such as the manner of touch at the first light-emitting unit, as well as the presence of a received indication from the doorbell that it has been activated. Upon execution by the controller, the control software engages the actuators, if the conditional relations pertaining to the sensory inputs are true, such as the color to emit in a flashing sequence from the second light-emitting unit, as well as the locking mechanism of the door lock, such as the extension or retraction of a bolt.

In the illustrative embodiment, the steps of the interpretation are all automatic and require no further input by the user. After completion, the graphical user interface on the secondary device can however indicate that the two specified associations have been activated.

In the illustrative embodiment the lighting system can function as a sensor for touch input, which associates with a door lock actuator. In the illustrative embodiment the lighting system can function as an actuator upon a sensory signal collected at a doorbell.

If at some point after this the user wishes to alter the associations, the steps are repeated, however with new definitions of associations between light-emitting units and actions. The new data array is sent to the controller as in the previous steps, and after similar steps to associate sensory inputs and actuators, a new data array is stored in memory and executed by the controller. As the control software is replaced or updated, additional checks can be part of the steps in order to ensure a secure and failsafe software update.

In other illustrative embodiments, the creation of the second data array comprising the control software is done on another device, not the controller itself. The other device can be a computer or server connected to the controller through the second network interface. The steps taken to interpret the first data array created through the user input can be performed remotely using parts of the information the controller has access to. This can have the advantage that any complex executions in order to create associations between sensory input and action, can be done without an increase of the requirements of the components comprising the controller. Cost and complexity of manufacturing can be kept low.

Other embodiments can be contemplated, wherein the full range of manners of touch is used in associations with either a light output of change of the light output, or with a secondary device or a plurality of secondary devices connected with the controller through a second network interface. In other embodiments, other secondary devices can be used as long as they can receive data arrays from the lighting system and/or transmit data arrays to the lighting system. The common feature in these embodiments is the ability to update the control software in order to enable new control associations.

In some embodiments the plurality of light-emitting units of the lighting system are modular and can therefore be placed in a variety of spatial relations to each other. The light-emitting units can in some embodiments be moved from one spatial location to another while the lighting system is electrically powered. In these embodiments therefore the association between sensory input and action is flexible not just in the sense that the control software can be updated by the user, but also in the sense that the layout of the lighting system can be updated as well as take up an area of irregular shape.

Conventional touch interfaces are typically constrained to the form factor set during manufacturing. In the above embodiments, both the form factor of the touch interface, as well as the control associations, are configurable by the user after manufacturing and after initial installation.

As for the smart home application, additional instances of game experiences can be downloaded to the controller from a database on the Internet, or at any other device connected through the second network interface of the controller. As such, the lighting system is expandable both in terms of being able to add additional light-emitting units to increase the games' playing field size, and in terms of being able to download a large variety of games embodied as control software executed by the controller.

Lighting System with Adaptive Power Control

A lighting system, which can be both spatially and optically configured by the user to a considerable degree, has many possible advantages. For example, aesthetic or architectural requirements become easier to meet without costly custom manufacturing, and light that is precisely adaptable to varying activities and individual needs, become possible. However, as fewer spatial and optical constraints are put on the user of the lighting system, the scope of possible ways the components of the lighting system and its control logic can be operated in increase as well. Without additional countervailing design of components and control logic, the user might therefore inadvertently configure the lighting system such that components exceed critical limits. For example, electrical current can be supplied to components through conductive metal traces, however, due to electrical resistance, heat is generated, which if too great would damage the lighting system.

A dual technical challenge presents itself: How to prevent faulty operations of a lighting system that can be configured in a myriad of ways? How to advice the user on how to alter a lighting system configuration in order to attain desired outcomes without risk of operational failure?

With respect to the former technical challenge, the solutions described in detail below build on three key parts: information about the spatial configuration, information about electrical relations, and means to control the optical output of each individual component that are part of the lighting system. From said information an inference is made through rapid and automatic computation if the particular lighting system a user has assembled is at risk of operational failure, and if so, where. The means to control the optical output is then used to impose specific limits to the particular lighting system. On account of this solution, no universal limits must be imposed, and still even a user lacking any skills in electrical engineering can creatively assemble a lighting system unencumbered by concerns of possible operational failure.

With respect to the latter technical challenge, one can ask how to avoid or reduce specific limits as inferred by the solution to the former technical challenge. An especially fruitful inference to make in this regard, is which placement of power supplies to a particular lighting system would allow the widest possible range of creative optical outputs still removed from risks of operational failure. A placement of a power supply can be as simple as a matter of where on the lighting system to connect the cables from the electrical sockets. Employing the same information as in the former solution, one or more ideal placements are inferred and shown to the user through selective illumination of these positions of the lighting system. On account of this solution, a user lacking any skills in electrical engineering can still assemble a lighting system in the desired spatial arrangement, while also optimally placing the power supplies with respect to operational electrical safety and efficiency.

In some embodiments, the lighting system is comprised of a plurality of independently configurable light-emitting units, a controller, and a power supply or a plurality of power supplies, and a first plurality of linkers. A linker of said plurality can electrically couple pairs of light-emitting units, or it can electrically couple a controller to a light-emitting unit or a plurality of light-emitting units, or it can electrically couple a power supply to a light-emitting unit or a plurality of light-emitting units. The linkers can in other words be the means to distribute electrical power throughout the lighting system, from the plurality of power supplies to the plurality of light-emitting units.

In some embodiments, the lighting system is comprised of a plurality of independently configurable light-emitting units, a controller, and a power supply or a plurality of power supplies, and a second plurality of linkers. A linker of said plurality can electrically and mechanically couple pairs of light-emitting units, or it can electrically and mechanically couple a controller to a light-emitting unit or a plurality of light-emitting units, or it can electrically and mechanically couple a power supply to a light-emitting unit or a plurality of light-emitting units. The linkers can in other words be the means to distribute electrical power throughout the lighting system, from the plurality of power supplies to the plurality of light-emitting units, as well as be the means by which a plurality of light-emitting remain together as a single contiguous unit under moderate disruptive forces, such as gravity or bending, as well as be the means by which other parts of the lighting system are attached to the plurality of light-emitting units.

In some embodiments a linker is a piece of printed circuit board (PCB), which can conduct electricity and transmit data arrays through a serial port connection. With a complementary indentation to insert the piece of PCB, the plurality of linkers can also provide the mechanical support for adhesion of light-emitting units into a contiguous lighting system. Additional embodiments of linkers for joining a plurality of light-emitting units electrically and mechanically can be contemplated, including the linkers described in US patent publication 20190132928A1. This document is incorporated herein by reference.

In preferred embodiments, the linkers can be reversibly attached and detached. The precise layout of the light-emitting units of the lighting system, that is how they connect to each other, is therefore not set once and for all during manufacturing. Rather it is up to the user to decide the structure. This property of the lighting system enables additional functionality to be created, wherein the light can provide more than general illumination to a space, and wherein the lighting system can sense multimodal action in its vicinity, such as the manner of touch a user applies to the lighting system and where the manner of touch is applied.

An illustration of lighting as more than illumination can be found in the increasing body of studies that suggest that artificial lighting can disrupt diurnal sleep rhythms to the detriment of the health of the individual. Individual differences in what constitutes optimal lighting is contemplated, where so called human-centric lighting design has been heralded as a paradigm shift in how it is the human occupants of a space, and their direct and indirect needs, that should govern how the lighting is done. In few places is this as evident as in care facilities, where older men and women with an increasing prevalence of health conditions receive care. There is evidence that lighting can favorably modulate disease symptoms through spectral variation during the day, or brightness and spatial dynamics that provides clear guidance on how to safely move around a space and avoid falls. The combination of spatial and spectral properties of lighting is therefore a powerful mix in the design of a space not just suitable for the basic function of illumination, but for the well-being of its occupants.

A further illustration of this is the difference in lighting in a lunch restaurant and in a dinner restaurant. The lighting of the former is typically activating and formal, attained by lighting that is bright, containing a greater amount of blue light wavelengths, and usually from lighting fixtures high above the customer of the restaurant. The lighting of the latter is typically relaxing and intimate, attained by lighting that is dim, containing a greater amount of red light wavelengths, and usually from lighting fixtures closer to the customer, like a pendant lamp just above the table or lighting on the table.

Other applications of lighting that more recently have received a similar consideration with respect to human factors not just related to the control of brightness is lighting in schools, care facilities and street lighting. The above are all examples of lighting being more than a form of illumination of a space. Rather, the placement and spectrum of the lighting contributes to the atmosphere of the space, its functionality and to a degree the health of the people inhabiting the space.

Therefore a lighting system that can be configured to various degrees with respect to the optical spectra of the light it emits, as well as the spatial arrangement of the sources of said light in the space and relative the users of that space, is better suited for human-centric lighting design such as, but not limited to, the examples above.

In the embodiments with a linker that can be reversibly attached and detached, a user may disconnect or connect a single or a plurality of light-emitting units at any moment. The user may also connect or disconnect a plurality of power supplies at any moment. In order to supply sufficient power to a sizeable plurality of light-emitting units, such as a plurality comprising 10, 25, 100, 500, or 5000 light-emitting units in a single coupled system, multiple power supplies may be necessary since the aggregate electrical power needed for the lighting system scales linearly with the size of the plurality of light-emitting units of the lighting system.

The operation of an assembly of light-emitting units requires electrical power to drive the components of the light-emitting units that generate the optical output or the luminous flux. The electrical current is supplied by one or a plurality of power supplies linked to the assembly. The electrical current is distributed from the power supplies to the plurality of light-emitting units through one linker or a plurality of linkers, and for some light-emitting units, through one or a plurality of intervening light-emitting units. Therefore the electrical current that powers a light-emitting unit can have been distributed throughout a plurality of power supplies via a plurality of linkers and a plurality of other light-emitting units. For an electronic component of the lighting system, this plurality of other components comprises the conductive pathway for the electronic component.

A given optical output of the lighting system therefore corresponds to a particular magnitude of electrical power from the power supply or the plurality of power supplies, as well as a particular distribution or routing of electrical current through the conductive components of the lighting system, the linkers and light-emitting diodes in particular.

Due to physical limits in the construction of power supplies, linkers and other electrically conductive components comprising the lighting system, as well as the numerous ways a lighting system can be assembled from a plurality of light-emitting units, operational conditions can be contemplated for which said physical limits are exceeded. Because the assembly is constructed by a user in preferred embodiments of the lighting system, rather than being defined once and for all during manufacturing, it is possible for a user to construct an assembly that can only attain a desired optical output if more current than what is available from the power supply or the plurality of power supplies was to be provided, or if more current is passed over one linker or a plurality of linkers of the assembly than what said linker is rated for. This excessive operational condition can be unsafe, can lead to unreliable operation of the lighting system, or can lead to irreversible damage to electronic components of the lighting system. Any of these conditions are referred to as an operational failure condition.

In other words, the flexibility enabled by the illustrative embodiment of a luminaire and its innovative design can make operational failure conditions manifest in lighting systems, unless the lighting system is constructed to automatically modify or constrain possible ways of operating the lighting system, such that no operational failure condition can become manifest.

For a lighting system comprised of light-emitting units connected according to a layout, an operational failure condition of a kind as illustrated above can be inferred by a method as described next. In some embodiments of the method, an operational adjustment is also inferred, such that no operational failure condition would be present in a lighting system of the layout used as input to the method.

The method to infer operational failure conditions can access the layout of the lighting system. The layout is comprised of the topology of the connections between light-emitting units, linkers and power supplies. This information can be contained in a first data array in the memory of a controller, computer or other device able to execute the instructions of the method.

Figure 6:
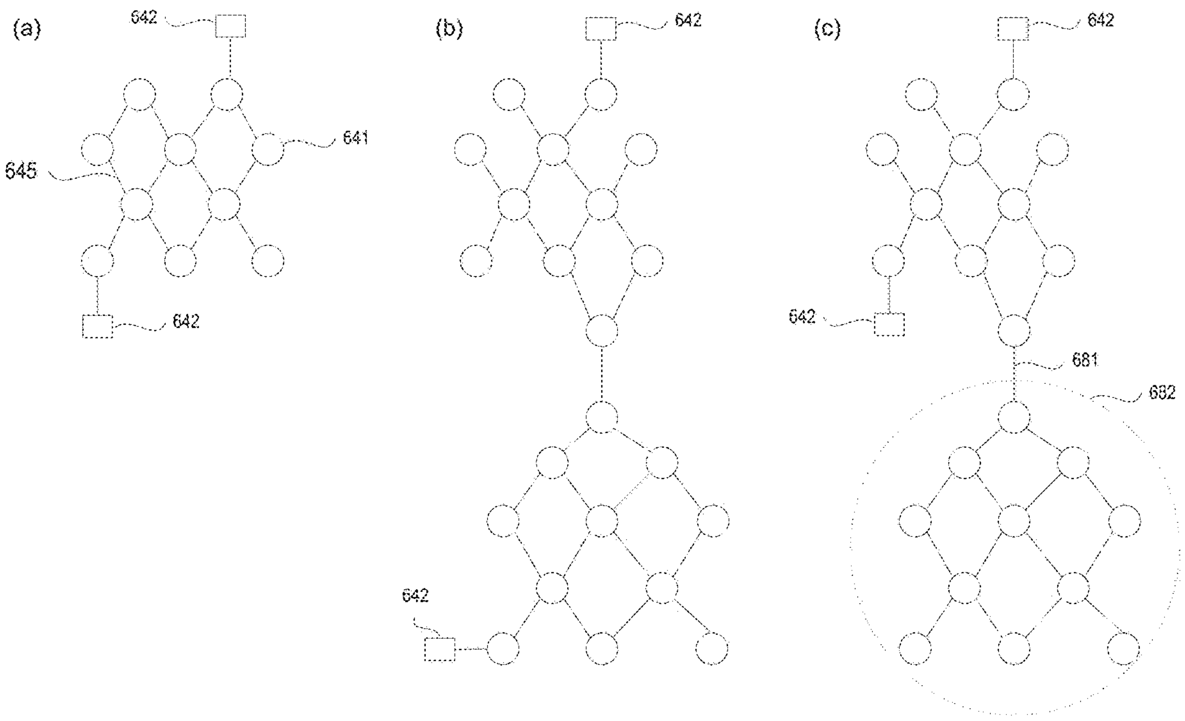
FIG. 6 illustrates three layouts of light-emitting units, and two power supplies, connected by a plurality of linkers, according to some embodiments.

In FIG. 6, three illustrative layouts are shown. The light-emitting units are represented as circles 641 connected by lines 645, which represent the linkers. The power supplies are shown as square boxes 642 connected to on light-emitting unit in the lighting system. Other layouts can be contemplated. FIG. 6(*c*) is illustrative of how a placement of two power supplies in relation to a "dumbbell" layout can lead to one linker in the plurality of linkers to exceed it limits. Through the linker 681 of FIG. 6(*c*) all current to power the plurality of light-emitting units of the lower half 682 of the layout of FIG. 6(*c*) must flow. Hence, a high optical output of the plurality of light-emitting units of the lower half 682 of the layout of FIG. 6(*c*) can require an excessive electrical current to be conducted by linker 681.

The method to infer operational failure conditions can access the electrical properties of the lighting system. The electrical properties of the lighting system is comprised of the system voltage characteristics, the highest allowed electrical currents the linkers can conduct, the maximum electrical power the power supplies can provide, as well as the effective electrical resistance of the electrical components that can be part of a path between a power supply and a functional component of a light-emitting unit, such as a light-emitting diode or a plurality of light-emitting diodes, a touch sensor, and a processing unit. If a light-emitting unit within the system is dimmable, the electrical power consumption associated with the light-emitting diode depends on the luminous flux the diode is generating. Therefore, these electrical properties of the overall lighting system circuit can depend on the optical specifications for the lighting system. Other functional components can be contemplated. This information can be contained in a second data array in the memory of a controller, computer or other device able to execute the instructions of the method.

In some embodiments, the highest allowed electrical current for linkers can be, but is not limited to, 1 Ampere, 2.5 Amperes, 6 Amperes, 10 Amperes. In some embodiments, the maximum electrical power the power supplies can provide can be, but is not limited to, 15 Watts, 24 Watts, 42 Watts, 75 Watts, 150 Watts. In some embodiments, the effective electrical resistance of the power supplies as well as the linkers can be 1 milliohm, 5 milliohms, 10 milliohms, 25 milliohms. In some embodiments, the electrical power consumption associated with the light-emitting diodes of the lighting system can be 0.2 Watts, 1 Watt, 3 Watts, 10 Watts. The relation between luminous flux and electrical power is an electro-optical relation (e.g., electro-optical rule), and can be experimentally measured, and can be retrieved from reference data sheets by the manufacturer of the light-emitting diodes.

The electro-optical rule can be nearly linear, though with an efficiency droop for higher powers that makes the relation moderately sub-linear.

The electro-optical rule can also depend on ambient temperature and for how many hours the light-emitting diodes have been electrically powered. In some embodiments the additional secondary factors pertaining to the electro-optical rule between luminous flux and electrical power are included as indices for interpolation.

In other embodiments, the additional secondary factors pertaining to the electro-optical rule between luminous flux and electrical power are disregarded.

The method to infer operational failure conditions can also access a desired optical output, which comprises the optical output of each light-emitting unit of the lighting system. The quantitative relation between an optical output and an electrical current for a light-emitting unit is known and can be accessed by the method. This information can be contained in a third data array in the memory of a controller, computer or other device able to execute the instructions of the method.

In some embodiments, desired optical outputs can be: all light-emitting units emitting white light of correlated color temperature (CCT) at 2700 Kelvin, each light-emitting unit emitting a luminous flux of 100 Lumens, 200 Lumens, or 500 Lumens; half of all light-emitting units emitting red light, the other half of the light-emitting units emitting blue light, each light-emitting unit emitting a radiant flux of 300 milliwatts, 650 milliwatts, 1 Watt, 3 Watts. Other desired optical outputs can be contemplated.

The inference that the method is solving is hence: given a desired optical output and the corresponding required electrical currents for the plurality of light-emitting units, embodied in the third data array, and given a layout of the lighting system, embodied in the first data array, which components of the lighting system, if any, have to be operated exceeding operational limits, embodied in the second data array?

The method can use the principle of electrical circuits called the superposition principle. From it follows that the electrical current at an electrical component of the lighting system is the linear aggregate of electrical currents from each power supply in the plurality of power supplies of the lighting system.

A first computation of the method can be of the plurality of electrical currents and the plurality of electrical powers provided by the power supplies, which imply a plurality of electrical powers at the plurality of light-emitting units. Since the layout of the light-emitting units of the lighting system is known, and therefore the plurality of conductive pathways is known as well, the first computation is possible.

Any linker or power supply, or other component, that is operating above its highest allowed values can therefore be determined by comparing the output of the first computation and the component data arrays.

A second computation of the method, following the first computation of the method, evaluates a least reduction of the plurality of electrical powers for the plurality of light-emitting units, such that no power supply or linker or other component are operating above their highest allowed values. The least reduction is no reduction in the event that the first computation determines that no components are operating above their highest allowed values.

The reason the least reduction is the target of the second computation is that this implies the least deviation from the initial power draw requirement for the plurality of light-emitting units. The least reduction can subsequently be applied to the operation of the lighting system, which ensures no operational failure condition can become manifest.

The first and second computation of the method can be performed in a number of different ways. Preferred embodiments are described next, though other embodiments of the method can be contemplated.

In some embodiments of the first computation of the method, a first power supply of the lighting system is considered, the other power supplies in the plurality of power supplies suppressed. The suppression of a power supply means it has been removed from the electrical circuit and replaced by wire shorts. The current flow calculation for the first power supply can then be as follows: For a first electrical power provided by the first power supply, the plurality of electrical properties of the power supply, linkers and light-emitting units are retrieved from the second data array of the method and distributed according to a layout or relative arrangement as in the first data array. Electrical circuits of a known layout of a plurality of components of known electrical properties can be solved to yield the current flowing over any component with an electrical resistance, or a resistor for short.

The Thévenin's Theorem describes a standard relation between electrical circuits, which enables a simpler electrically equivalent circuit to be derived, also called a Thévenin-equivalent circuit. Therefore, in some embodiments of the first computation of the method, the electrical currents and powers for components are solved for in the relevant Thévenin-equivalent circuit. Thévenin's Theorem, Thévenin-equivalent circuits, and circuit solving methods are described in textbooks in electrical engineering, such as Electrical Circuits by Kang published in 2018. Other methods to compute the electrical current given the above information can be contemplated.

At the next step, a second power supply is considered, the other power supplies in the plurality of power supplies suppressed, and the equivalent steps as for the first power supply are taken. However, the placement of the second power supply relative to the other components of the lighting system can be different than for the first power supply. Therefore, the electrical currents and electrical powers that are computed for the second power supply, given the information in the first and second data arrays, can be different than the electrical currents computed for the first power supply. Each plurality of values of electrical currents and electrical powers can be stored, each value indexed on a power supply, and on a resistor component of the lighting system.

The steps of solving the circuit are repeated until all power supplies in the plurality of power supplies have been considered. At this stage of the embodiment of the method, a first component of the lighting system is considered. All electrical currents indexed on the first resistor component are summed. In other words, the data array of two indices is grouped by the index for the components. At the next step all electrical currents indexed on the second resistor component are summed. The steps are repeated until all resistor components of the lighting system is associated with a summed value of electrical currents.

According to the superposition principle of electrical circuits, the aggregated electrical currents obtained for each resistor component of the lighting system obtained as described above, is the value of the electrical current at the electrical components in a lighting system, constructed as defined in the first and second data arrays.

In some embodiments of the method, the actual optical output of the lighting system can be computed from the plurality of electrical currents and plurality of electrical powers at the light-emitting units. The actual optical output can be compared against a desired optical output, as embodied in the third data array above. The comparison can test if the two optical outputs are equal, or if they are quantitatively no different than a threshold. If the two optical outputs meet the criterion, the method can set a Boolean variable to True. If the two optical outputs fail to meet the criterion, the method can set a Boolean variable to False.

In some embodiments of the method, the plurality of electrical currents at each electrical components is compared against the plurality of maximum allowed values, which defines the operational failure condition, as embodied in the second data array above. If at least one linker in the plurality of linkers has a computed electrical current that exceeds its highest electrical current, the operational failure condition is True. Therefore, a lighting system that is operated as such can be expected to manifest operational failure, as defined above. If at least one power supply in the plurality of power supplies has a computed electrical power that exceeds its maximum electrical power, the operational failure condition is True.

Therefore, a lighting system that is operated as such can be expected to manifest operational failure, as defined above. If at least one other electrical component in the plurality of other electrical components, such as a sensor circuit, has a computed electrical current that exceeds its highest electrical current, the operational failure condition is True. Therefore, a lighting system that is operated as such can be expected to manifest operational failure, as defined above.

In some embodiments of the method, the inference that a failure condition is True can be communicated to the user through an interface that prompts the user to not operate the lighting system as designed. The user can upon receiving such a notification take an action in order to rectify this.

The action can be the reconfiguration of the layout of the lighting system, such as placing light-emitting units in new positions, removing light-emitting units from the lighting system, or joining additional power supplies to the lighting system, or placing power supplies in new positions of the lighting system, or the action can be operating the lighting system at a different desired optical output. The method to infer operational failure conditions can be executed once more with the new corresponding data arrays.

In some embodiments of the method, the inference that a failure condition is True can be used to initiate additional method steps. The additional method steps can compute a brightness reduction factor. The brightness reduction factor scales the optical output of the plurality of light-emitting units to smaller values, until the operational failure condition becomes False. Since a higher brightness requires a higher electrical current, a reduced brightness is guaranteed to lead to lower electrical currents and reduced electrical powers in the lighting system.

The evaluation of a least reduction of brightness, and hence a least reduction of electrical powers, can be done by scaling the operational conditions by multiplication by a factor less than unity, but no less than the greatest value for which the operational failure condition is False.

In some embodiments of the method, the brightness reduction factor is communicated to the plurality of light-emitting units, or to a controller of the plurality of light-emitting units in a lighting system. The brightness reduction factor is enforced by the lighting system, such that a user cannot inadvertently set a desired optical output that exceeds that defined by brightness reduction factor. The optical output of the lighting system is therefore throttled in order to automatically guard against an operational failure condition to become manifest.

In some embodiments of the method, a multivariate brightness reduction factor is computed. The multivariate brightness reduction factor scales the optical outputs of the plurality of light-emitting units to values less than or equal to what is required to meet the desired optical output. The scaling can however be different between different light-emitting units, such that the optical output for some units are reduced by a first scaling factor and that the optical output for some other units are reduced by a second scaling factor, the first and second scaling factors being unequal. In some embodiments the number of quantitatively unique scaling factors is equal to the number of light-emitting units in the plurality. In some embodiments, the number of quantitatively unique scaling factors is less than the number of light-emitting units in the plurality.

The evaluation of a least reduction of brightness, and hence a least reduction of electrical powers, can be done by scaling the operational conditions by multiplication with a plurality of factors less than or equal to unity, but no less than the greatest value for which the operational failure condition is False. For some lighting systems there can be multiple least multivariate brightness reduction factors. In some embodiments of the method, one is chosen randomly. In other embodiments, the one with the least variation between composite factors is chosen. Other ways to choose one least multivariate reduction factor can be contemplated.

In some embodiments of the method, the multivariate brightness reduction factor is communicated to the plurality of light-emitting units, or to a controller of the plurality of light-emitting units in a lighting system. The multivariate brightness reduction factor is enforced by the lighting system, such that a user cannot inadvertently set a desired optical output that exceeds that defined by one component factors in the multivariate brightness reduction factor, or that defined by a plurality of component factors in the multivariate brightness reduction factor. The optical output of the lighting system is therefore throttled in order to automatically guard against an operational failure condition to become manifest.

The steps of the method can be executed on a computer that is not a part of a lighting system as long as the properties of the lighting system are known. As long as a lighting system can transmit the data in the first, second and third data arrays described above to the computer, the method steps of the inference of an operational failure condition can be executed remote from the lighting system. The computer can transmit the outcome of the inference to the controller of the lighting system, including any thresholds on brightness to be enforced by the lighting system. The communication of data arrays between computer and lighting system can be done through a network interface of the controller of the lighting system.

In some innovative lighting systems, the method to infer operational failure conditions is executed by the controller of the lighting system. In these embodiments the controller is electrically powered before a desired optical output is provided by the lighting system.

A default value for optical output for the system can be provided, including, but not limited to 0%, 1%, 2%, or 5% of the desired optical output, such that the likelihood of initial failure is minimized or eliminated. Under such conditions, the controller can retrieve all necessary data about the layout and the components of the lighting systems in order to execute the steps of the method.

After the method is executed, a possible operational failure condition can be determined, and actions taken as described above. That is, the method steps can determine that if the lighting system was provided with a first desired optical output of a certain kind, then an operational failure condition would be True. If potential conditions of this kind are found, the lighting system can enforce brightness reduction factors or other operational thresholds, such that if the user specifies the first desired optical output, the lighting system is prevented from creating an actual optical output like that. In this way, the operation failure condition cannot become manifest.

A lighting system that enforced inferred limits of this kind can have two immediate benefits to the system and its operation by a user.

The first benefit is to ensure that no power supply is overloaded. Depending on the safety protections available for a given power supply, overloading a power supply can either cause it to cease providing current entirely, or the current can be limited by reducing the voltage provided by the power supply. If a power supply ceases to supply current entirely, the modular lighting system can adjust and take current from other power supplies in the lighting system. But this adjustment can risk overloading the other power supplies. A cascade of failing power supplies can then occur. On the other hand, if one power supply becomes overloaded and reduces the voltage in order to prevent being overloaded, the light-emitting units can adjust to pull current from other power supplies disproportionately. The other power supplies, assuming they have a similar response to overloading, can then also lower their voltage. The net effect will be an overall voltage drop in the system. This may result in malfunction of the lighting system, such as reduced brightness, optical flickering due to instability in voltage, shutdown of one or more light-emitting units and/or shutdown of the controller, or some other irregular and undesirable optical output.

The second benefit is to ensure that none of the individual linkers, components, or conductive parts of the light-emitting units are overloaded. If they were to be overloaded, the resistive heating can cause localized and permanent failure of the electrical connection or pose a fire or melting risk for the system, nearby objects, or the surface.

The ultimate user benefit of the above method and the enforcement of the determined operational limits is that a user can construct a lighting system layout however they like free of the risk of causing electrical failure or unreliable operation. In a lighting system that is constructed and for which the above method is applied, the operational failure conditions cannot be knowingly or unknowingly brought about. The user can therefore construct the luminaire without detailed instructions pertaining to said operational failure conditions, and rather direct their attention to the design of a lighting system that can optimally serve a purpose through the combination of spatial and spectral properties of the lighting.

Method and System of Power Control Placement for Lighting System

In an earlier section, an operational failure condition is defined that follows from that a power supply or a plurality of power supplies, and a plurality of linkers, and a plurality of other electrically conductive components of a lighting system are physically limited with respect to their electrical operation. The methods and lighting systems described in that section can assume a fixed layout of the light-emitting units. The methods and lighting systems can therefore infer operational limits in order to avoid the operational failure condition given a layout.

A placement of a power supply can be as simple as a matter of where on the lighting system to connect the cables from the electrical sockets. Employing the same information as in the former solution, one or more ideal placements are inferred and shown to the user through selective illumination of these positions of the lighting system. On account of this solution, a user lacking any skills in electrical engineering can still assemble a lighting system in the desired spatial arrangement, while also optimally placing the power supplies with respect to operational electrical safety and efficiency.

In some embodiments of the lighting system, the placement of the power supplies relative the light-emitting units is flexible. That is, as part of the installation and the user configuration of the lighting system, the user can place the plurality of power supplies in a plurality of positions relative the lighting system, the latter plurality being greater in number than the former plurality.

In some embodiments, there can be placements of power supplies that are better than other placements of power supplies. The contrast between the illustrative layouts of FIG. 6(*c*) and FIG. 6(*b*) is only with respect to where the two power supplies 642 are placed relative the plurality of light-emitting units of the lighting system.

However, the placement of power supplies as in FIG. 6(*b*) is preferred because less electrical current has to flow across the critical linker 681. The illustrative embodiments in FIG. 6(*b*) and FIG. 6(*c*) are relatively easy to evaluate in this regard. In other embodiments of a lighting system constructed with a flexible layout, the optimal, or at least near optimal, placement of power supplies is not as easy to infer by a user. Understanding why a particular layout may be enforced to operate at a reduced brightness will be difficult for most users to intuitively grasp. If a user creates a configuration in which the brightness must be limited to ensure system reliability and safety, the path to resolve the situation will not always be straight forward. This is especially evident when a very large number of light-emitting units, such as 100 or 500 units, are part of the lighting system. The possible number of combinations to attach a power supply to a lighting system of this size is very large due to a combinatorial explosion.

In this section methods and lighting systems that can assist a user during the installation of a lighting system with respect to the placement of power supplies are described. Methods and systems like this benefits the user not only with respect to the automatic prevention of the manifestation of an operational failure condition, but also with respect to how to prevent said conditions with the least reduction of possible desired optical outputs, and without a change of the layout of the light-emitting units.

The method to infer optimal power supply placements builds on the method to infer operational failure conditions, as described in a section above. The method to infer optimal power supply placements therefore uses the same plurality of data arrays.

Therefore, the method to infer optimal power supply placements can access the layout of the lighting system. The layout is comprised of the topology of the connections between light-emitting units, linkers and power supplies. This information can be contained in a first data array in the memory of a controller, computer or other device able to execute the instructions of the method.

In FIG. 6, three illustrative layouts are shown. The light-emitting units are represented as circles 641 connected by lines 645, which represent the linkers. The power supplies are shown as square boxes 642 connected to on light-emitting unit in the lighting system. Other layouts can be contemplated.

FIG. 6(*c*) is illustrative of how a placement of two power supplies in relation to a "dumbbell" layout can lead to one linker in the plurality of linkers to exceed it limits. Through the linker 681 of FIG. 6(*c*) all current to power the plurality of light-emitting units of the lower half 682 of the layout of FIG. 6(*c*) must flow. Hence, a high optical output of the plurality of light-emitting units of the lower half 682 of the layout of FIG. 6(*c*) can require an excessive electrical current to be conducted by linker 681.

The method to infer optimal power supply placements can access the electrical properties of the lighting system. The electrical properties of the lighting system is comprised of the highest allowed electrical currents the linkers can conduct, the maximum electrical power the power supplies can provide, as well as the effective electrical resistance of the electrical components that can be part of a path between a power supply and a functional component of a light-emitting unit, such as a light-emitting diode or a plurality of light-emitting diodes, a touch sensor, and a processing unit.

The electrical resistance associated with the light-emitting diode depends on the luminous flux the diode is generating. Therefore, this resistance can depend on the optical specifications for the lighting system. Other functional components can be contemplated. This information can be contained in a second data array in the memory of a controller, computer or other device able to execute the instructions of the method.

In some embodiments, the highest allowed electrical current for linkers can be, but is not limited to, 1 Ampere, 2.5 Amperes, 6 Amperes, 10 Amperes. In some embodiments, the maximum electrical power the power supplies can provide can be, but is not limited to, 15 Watts, 24 Watts, 42 Watts, 75 Watts, 150 Watts. In some embodiments, the effective electrical resistance of the power supplies as well as the linkers can be 1 milliohm, 5 milliohms, 10 milliohms, 25 milliohms. In some embodiments, the electrical power consumption associated with the light-emitting diodes of the lighting system can be 0.2 Watts, 1 Watt, 2 Watts, 10 Watts.

The relation between luminous flux and electrical power is an electro-optical rule, and can be experimentally measured, and can be retrieved from reference data sheets by the manufacturer of the light-emitting diodes. The electro-optical rule can be nearly linear, though with an efficiency droop for higher powers that makes the relation moderately sub-linear.

The electro-optical rule can also depend on ambient temperature and for how many hours the light-emitting diodes have been electrically powered. In some embodiments the additional secondary factors pertaining to the electro-optical rule between luminous flux and electrical power are included as indices for interpolation. In other embodiments the additional secondary factors pertaining to the electro-optical rule between luminous flux and electrical power are disregarded.

The method to infer optimal power supply placements can also access a desired optical output, which comprises the optical output of each light-emitting unit of the lighting system. The quantitative relation between an optical output and an electrical current for a light-emitting unit is known and can be accessed by the method. This information can be contained in a third data array in the memory of a controller, computer or other device able to execute the instructions of the method.

In some embodiments, desired optical outputs can be: all light-emitting units emitting white light of correlated color temperature (CCT) at 2700 Kelvin, each light-emitting unit emitting a luminous flux of 100 Lumens, 200 Lumens, or 500 Lumens; half of all light-emitting units emitting red light, the other half of the light-emitting units emitting blue light, each light-emitting unit emitting a radiant flux of 300 milliwatts, 650 milliwatts, 1 Watt, 3 Watts. Other desired optical outputs can be contemplated.

The inference that the method is solving is hence: given a desired optical output and the corresponding required electrical currents for the plurality of light-emitting units, embodied in the third data array, and given a layout of the light-emitting units of the lighting system, embodied in the first data array, which placements of the plurality of power supplies leads either, to that no components of the lighting system have to be operated exceeding operational limits, embodied in the second data array, or to that a minimal reduction of the desired optical output is required in order to stay within operational limits?

In some embodiments of the method, an exhaustive enumeration of placements of power supplies are done. In an illustrative embodiment of a lighting system that has five possible placements of power supplies and two functionally identical power supplies, there are ten unique placements of power supplies.

For each possible placement, the method to infer operational failure conditions, as described above, is executed on a controller, computer or other device with a processing units. The outputs of the method executions for each possible placement are compared. The placements that contain no linker, power supply or other component that is overloaded are labelled as optimal. In other words, a placement of power supplies that has no operational failure condition for desired optical output is stored in a data array labelled optimal.

If all of the possible placements imply an operational failure condition, the preferred placement is the one that requires the least adjustment of actual optical outputs from desired optical outputs. In illustrative embodiments described in a previous section, the adjustment is quantified through a brightness reduction factor or a multivariate brightness reduction factor. Other types of adjustments of the operation of the lighting system can be contemplated in order to prevent the manifestation of an operational failure condition. In these embodiments of the method and lighting system, the placement that has the smallest brightness reduction factor is stored in a data array labelled optimal.

The exhaustive enumeration of placements of power supplies can become computationally infeasible for large enough lighting systems. Therefore, in some embodiments of the method, a smaller plurality of putative placements of power supplies is constructed. Because one reason of an operational failure condition is that electrical current has to go through a great number of components and linkers of the lighting system in order to drive some light-emitting units of the lighting system, and because of the known spatial information about the lighting system, a far apart placement of power supplies relative to each other can be more likely to contain no operational failure conditions.

In an illustrative embodiment wherein the light emitting units are in a layout of a collective shape similar to an ellipse, and two power supplies are available for placement, the most far apart placement involves light-emitting units at or near the terminal points of the semi-major axis. Limited to the corresponding possible points of placements, an exhaustive enumeration can be done and the putative placements tested as described above. One or a plurality of placements labelled as optimal can therefore be obtained. In other embodiments of the method, a single point of placement is selected from the first terminal point of the semi-major axis, and another single point of placement is selected from the second terminal point of the semi-major axis.

In other embodiments, the layout of the light-emitting units can form an irregular shape. A smaller set of possible placements can be less evident to compute from simple geometrical considerations. In some embodiments of the method, a smaller set of possible placements is obtained by an iterative search for light-emitting units to which a power supply can be joined, and which are as far apart as possible. Since the spatial layout of the light-emitting units is known, embodied in the first data array, the pairwise distances between all light-emitting units of the lighting system can be computed. An objective can then be minimized, which is the sum of the inverse distance between all power supplies of the lighting system. With this objective, a placement of power supplies close to each other is disfavored. This method can return multiple possible placements for the power supplies. Therefore, for these possible points of placements, an exhaustive enumeration can be done and the putative placements tested as described above. One or a plurality of placements labelled as optimal can therefore be obtained.

In other embodiments, the layout of the light-emitting units can form a shape comprised of clusters of light-emitting units. A plurality of light-emitting units can form a cluster if the light-emitting units in the cluster are well connected to each other, while the light-emitting units in the cluster are moderately connected to light-emitting units not in the cluster. In layouts with well-defined clusters, a small number of linkers can be the only means to conduct electrical current from light-emitting units in a first cluster to light emitting units in a second cluster.

Therefore, in order to reduce the risk that said small number of linkers exceed their operational limits, a first power supply or a first plurality of power supplies, can be joined to a light-emitting unit in the first cluster, and a second power supply or a second plurality of power supplies, can be joined to a light-emitting unit in the second cluster.

There are several methods to perform cluster analysis based on a pairwise distance matrix between light-emitting units, such as but not limited to K-means clustering, linkage clustering, DBSCAN, HCS clustering. Given a plurality of clusters the putative placements of power supplies can be selected such that all clusters containing more than some threshold number of light-emitting units has a power supply joined to a light-emitting unit of that cluster.

Other methods can be contemplated. The common quality is that for a lighting system, a plurality of placements can be inferred, such that joining power supplies to these places creates optimal operating conditions.

In order to guide the user to install a lighting system in an optimal manner, or to join power supplies to different light-emitting units on an already installed lighting system, the data array of optimal placements of power supplies can be communicated to a device with a graphical user interface, such as a computer or smartphone in some embodiments. On the graphical user interface the places for optimal joining of power supplies can be highlighted by some color indicator, text or icon. The user can be guided by the visualization on the graphical user interface and adjust the placement of power supplies accordingly on the lighting system.

Figure 7:
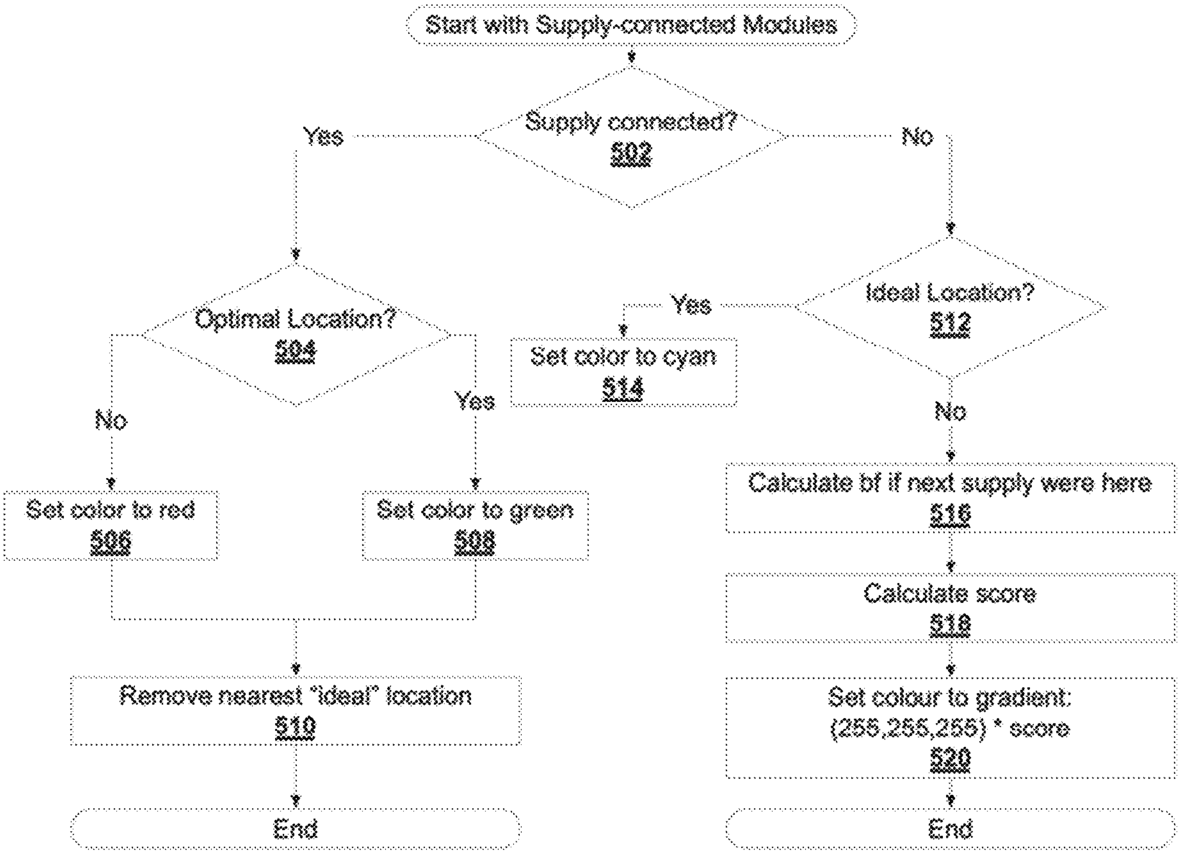
FIG. 7 illustrates a process executed on the controller of a lighting system in order to determine how to color the light-emitting units of the lighting system such as to guide a user where to best place the power supplies, according to some embodiments.

In other embodiments, the method is executed on processing units of the lighting system, see FIG. 7 for flow-chart illustration, such as the processing unit of the controller, and the preferred light-units to join power supplies to be highlighted directly on the lighting system. In order to do so, at least one power supply must be joined to the lighting system providing sufficient electrical current to enable a few light-emitting units to be illuminated as highlight.

The light-emitting units to which optimally power supplies are to be connected can light up, or be colored in another informative manner. This not only indicates where a user should join power supplies, but also makes it easy for the user to know how many power supplies are needed in total. In a preferred embodiment, the indication uses light of the cyan color 514. In cases where a position, had it been connected to a power supply 516, would lead to an adjustment of actual optical outputs from desired optical outputs 518 to some degree, the color of the light-emitting unit at said position can be colored in proportion to said degree of adjustment 520. A color of a light emission from a given light-emitting unit can therefore be matched with the better positions for additional power supplies.

Figure 8:
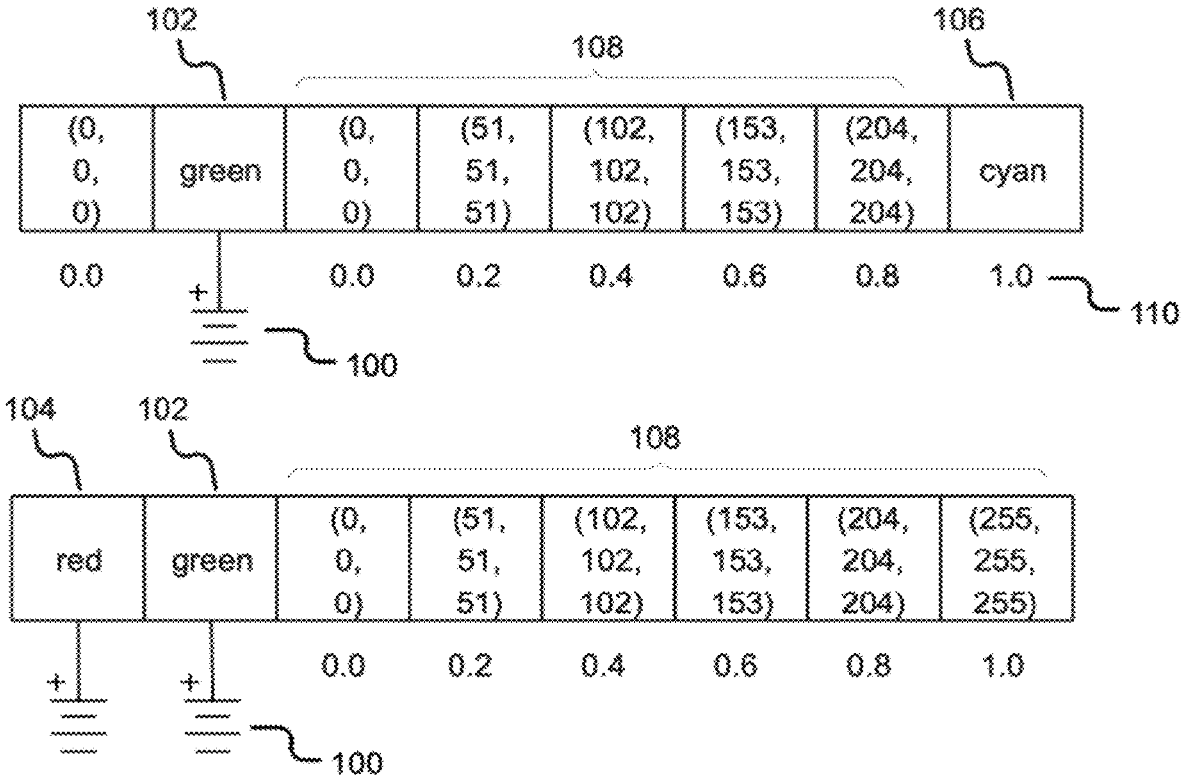
FIG. 8 illustrates a plurality of light-emitting units connected to a power supply, wherein the color of the light-emitting unit is on a spectrum in proportion to where an additional power supply is best placed, according to some embodiments.

In other embodiments, a color gradient can be used to inform the user about where to add an additional power supply or where to move an existing sub-optimal power supply, see FIGS. 8 and 108. In these embodiments, the gradient ranges from black (Red, Green, Blue=0,0,0) to white (Red, Green, Blue=255,255,255), where black indicates suboptimal placement and white indicates ideal placement. Other color gradients are possible.

The color of a light-emitting unit can be determined by determining the brightness reduction factor for the entire lighting system, as instructed in the disclosed method above, for the hypothetical configuration where another power supply is connected to the specific light-emitting unit. The light-emitting unit with the greatest value of the brightness reduction factor is assigned the gradient value of 1.0, which corresponds with the white optical output (or 255,255,255).

The brightness reduction factor without any additional power supply added to the lighting system is assigned a gradient value of 0.0, which corresponds with the black optical output (or 0,0,0). The brightness reduction factors for each of the light-emitting units of the lighting system, computed under the corresponding hypothetical configuration as defined above, falls between the two extreme points.

The color of the optical output for the light-emitting units are assigned as a proportional scaling of the gradient value 110. Therefore, the light-emitting units output light of a color on a scaled Red-Green-Blue spectrum 108. The color of the optical output of the plurality of light-emitting units can therefore be informative of where best to place an additional power supply.

The range of colors spatially distributed over the plurality of light-emitting units in the lighting system can be called a heatmap which guides the power supply installation.

The heatmap indication can be beneficial as it presents the user with a range of ranked choices. In some embodiments of the lighting system, the indication of the optimal placement of the power supply can show a single option that may be possible or very hard for a user to use.

For example, the optimal placements can be in the center of the layout of light-emitting units, or it can be far from outlets or other wired power sources. Therefore, a user can with the heatmap indication select second best, third best, and so on, placements that may still prove adequate for the highly functional usage of a configurable lighting system.

In addition, the heatmap indication provides a mechanism to guide installation that can be shown to the user without the requirement to connect to a secondary device with a graphical user interface to the lighting system. This can be useful during the initial setup process, which can be more likely performed prior to the user having taken the actions needed in order to connect the secondary device to a network interface of the lighting system.

Lighting System with Visually Indistinct Controller

In order to overcome all of the above technical challenges, computation is a key part. The unit of a lighting system on which this computation is performed is referred to as the controller (e.g., a controller circuit).

Because the controller is functionally distinct from the units that generate light, the controller is typically visually distinct. It can be an obstacle to a desired design by the user to have to accommodate a visually distinct controller.

An attractive design is therefore to integrate the functionally distinct components of the controller into a unit that generates light. This implies that at least one unit of the configurable lighting system must contain additional electronics that are constrained to a smaller space. Designs that overcome this are described in detail below, and include multi-layered circuit boards. However, providing the attractive design is technically challenging as there are volumetric and spatial limitations to be overcome. Accordingly, as described in some embodiments, specific apparatuses for providing a visually indistinct controller circuit are described (visually indistinct relative to the other light emitter devices).

In some embodiments the lighting system is comprised of a plurality of light-emitting units, a power supply or a plurality of power supplies, and a controller. The controller is further comprised of components that can execute logical instructions, such as a processing unit or a microcontroller.

These logical instructions can lead to the creation of a data array, the transmission of a data array through a network interface of the controller, the reception of a data array through a network interface of the controller, the storing of a data array in the digital memory of the controller, the retrieval of a data array from digital memory of the controller, the transformation of a first data array into a second data array, and the consumption of a data array. These transactions of data arrays can in turn relate to events external to the controller.

In a luminaire system, the external events related to data arrays can include the adjustment of electrical current to a light-emitting diode in a light-emitting unit or a plurality of light-emitting units, the event of a light-emitting unit or a plurality of light-emitting units being touched, the event of transforming a data array representing an audio signal obtained from a transducer into a lighting output, the event of switching on all available lights of the luminaire as a wake-up alarm triggered by a certain hour being reached at an internal clock, the event of a doorbell being activated. Additional useful applications in which the controller is integral to the function have been described in earlier sections as well. These are illustrative examples of what a controller can do and should not be understood as an exhaustive enumeration.

The controller can be integral to the usage of the luminaire and its beneficial applications in human-centric lighting design, smart home applications and gaming for entertainment, among other applications.

The controller as illustrated above can be functionally distinct from the more numerous light-emitting components of the luminaire. Additionally, the controller components can be visually distinct from the other components of the luminaire. In particular, the controller components can be incapable of creating light. The luminaire system as a whole can therefore be comprised of at least two visually distinct types of components, one of which is not luminous when electrically powered.

Prior lighting systems sold on the market have tried to minimize the appearance of the controller by making its size relatively small or by using colored materials to blend the controller with the background, typically a wall or some other mounting surface. Other attempts to reduce the apparent discrepancy between components of the rest of the lighting system have made it easy to hide the controller by making the communication interface between the controller and the plurality of light-emitting units that the controller controls wireless in nature. However, wireless controllers are less reliable in nature because they are subject to electromagnetic interference and signal attenuation.

Therefore, in many cases, placing the central controller near the light-emitting units the controller communicates with has clear advantages. This functionally preferred solution, however, means the controller is mounted beside the light-emitting units in plain view to the users of the space. In some applications this is considered undesirable due to space limitations, aesthetic requirements, or other architectural constraints.

One example in which a discrepancy in appearance would diminish utility, is a kitchen backsplash wherein by architectural specification every tile is required to maintain the same overall theme, design, or look. A lighting system designed as part of the backsplash may add additional appeal and function to the backsplash if the individual light-emitting units that make up the backsplash present a geometrical shape that is compatible with the other tiles that comprise the backsplash.

A backsplash, for example, could be built by tessellating square tiles. A controller, that is either not a square tile, is a square tile of a different size than the light-emitting units, or is a square tile but does not light up in the same way as the light-emitting units, can be deemed incompatible with the particular backsplash design. One option is to place the controller behind the wall or ceiling near to where the luminaires are installed and connect it with appropriate wires to one light-emitting unit or a plurality of light-emitting units. However, this may be disadvantageous in many circumstances because of the need to drill holes in the wall or ceiling and provide extra and more complex wiring. In other cases this may simply be impossible or not practical due to space limitations or because it creates a too arduous process of installation by the typical user.

For the reasons above, a lighting system in which the controller appears appreciably identical to the light-emitting units provides a number of benefits over existing solutions. It can meet additional architectural specifications, it can be easier to install, and it can provide a more reliable control of the luminaire even in a space in which other wireless electronics are active.

Technical challenges to overcome in order to design a lighting system with a controller with properties as described above, can include: (1) A controller can require additional electronic components compared to the light-emitting units, including a processing unit and memory, or a processing unit and memory or a greater footprint on a circuit board. The controller can have additional sensors compared to the light-emitting units, such as but not limited to temperature sensors, ambient light sensors, humidity sensors, or motion sensors.

In some embodiments the light-emitting unit is comprised of a thin sheet of plastic, comprised of an optical diffuser. A thin light-emitting unit of low weight can with less constraints be integrated with surfaces other than the ceiling when compared to heavier constructions, or to lamps and general luminaires that are thicker. Walls, floors, cupboards, pillars or support columns, as well as certain furniture and hardware can in addition to the ceiling be the area to which thin light-emitting units are mounted.

Therefore, with appropriate mechanical design a thin light-emitting unit enables additional means to design beneficial lighting in architecture and interior design. The construction of thin light-emitting units can be challenging in other regards, in particular the optical design. Methods and systems to overcome these challenges can include, but is not limited to, those disclosed in patent publication WO2019052294A1. This publication is incorporated herein by reference.

For thin light-emitting units, the placement of additional electronic components can therefore be particularly cumbersome and can require an innovative step.

In illustrative embodiments, a design or a plurality of designs can be employed:

(1) Use of printed circuit boards (PCBs) with a relatively large number of conductive layers, such as four layers, six layers, or eight layers. This enables the construction of circuit boards that pack electronic components more densely.

(2) Use of smaller electronic components, such as 0603 resistors, 0402 resistors, which can be functionally distinct from larger electronic components, which therefore can require an altogether different layout of the electronics in order to implement the functionality of the controller under the electrical operational conditions implied by the smaller components. This enables the electrical functionality to be designed with a smaller footprint.

(3) Use of Surface-Mount Technology (SMT) in order to miniaturize the plurality of components through a pick-and-place machinery that can package components in a circuit at a greater density than conventional soldering methods allow.

(4) Use of multiple PCBs that are electrically coupled using soldered joints, pin headers, or connectors. The additional PCBs can be called daughterboards. This can enable a circuit to be packed more densely or to have an irregular footprint that better fits the space within the housing of the light-emitting unit.

(5) Use of compact embodiments of antennas, such as F PCB antennas or ceramic chip antennas. Antennas can be required for controllers with a wireless network interface. Many existing antenna designs can have a large footprint because antennas have to induce electromagnetic radiation of specified frequency, such as 2.4 Gigahertz. Other designs can be contemplated.

Figure 9:
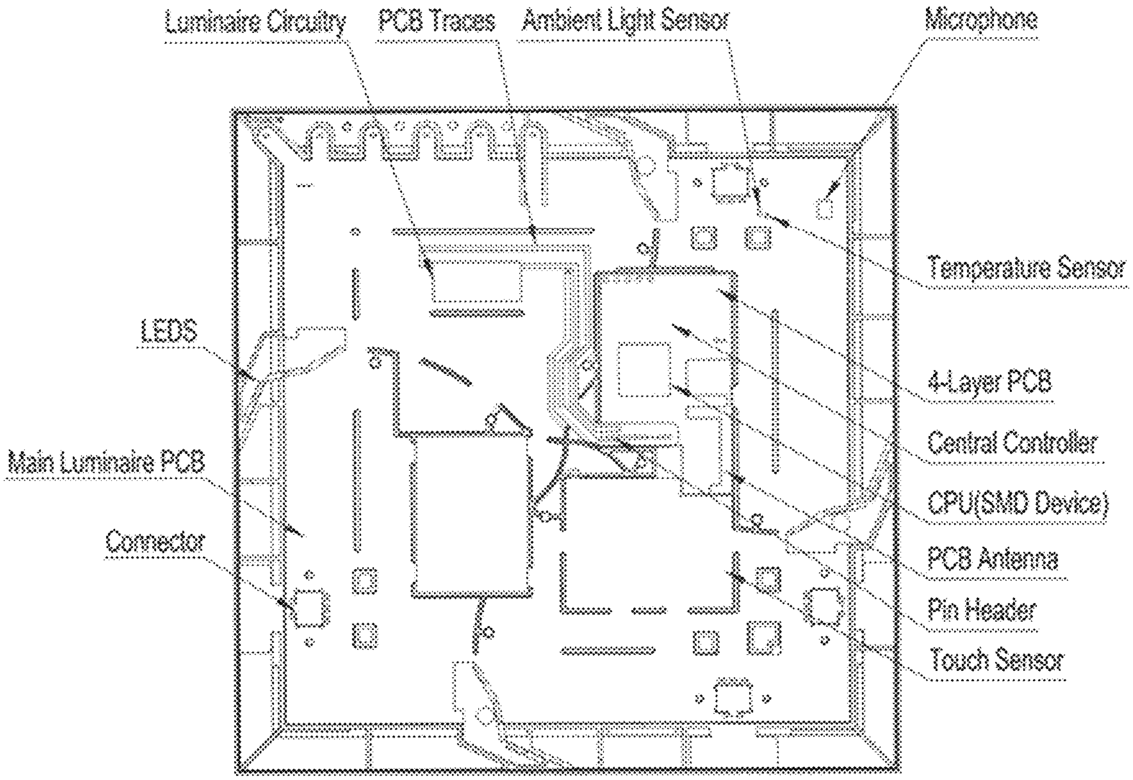
FIG. 9 illustrates a controller unit appreciably identical in appearance to a light-emitting unit, despite the greater number of required components for the former unit, according to some embodiments.

An illustrative embodiment of a controller that appears appreciably identical to a thin light-emitting units is shown in FIG. 9. Other designs can be contemplated.

These designs of a controller that appears appreciably identical to a light-emitting unit can furthermore reduce or remove the need for additional electrical protection components such as ESD protection diodes, MOVs, surge suppressors, ground shields, and so on, that would otherwise be needed if the controller was not physically contained within a unit already containing components for the generation of light output.

Additionally, the volume of plastic material used to construct the controller in a structurally sound way would typically be quite similar to the volume of plastic material used to construct a regular luminaire. One can easily see that any plastic material that would otherwise be used to construct a controller that is housed separately from a luminaire is saved. This can have cost advantages, manufacturing advantages, or environmental impact advantages.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of some embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A lighting system comprising a controller including a processing unit, a computer memory, and one or a plurality of network interfaces, a plurality of light-emitting units, and a plurality of touch sensors; wherein each light-emitting unit of the plurality of light-emitting units includes a plurality of light emitters, which creates light emission;

wherein a touch sensor of the plurality of touch sensors is structurally contained within a corresponding light-emitting unit or the controller, and the touch sensor is configured to generate a sensory signal associated with a manner of touch adjacent to the light-emitting unit or the controller the touch sensor is structurally contained within, and to communicate the sensory signal to the controller;

wherein the controller stores in memory: a first data array representation of the physical arrangement of the plurality of light-emitting units and the controller, and a second data array representation of a plurality of mappings between the sensory signal at a physical position of the lighting system, and an action of a plurality of actions;

wherein a third data array representation of a first action or a first plurality of actions is generated by the controller after the sensory signal or a plurality of sensory signals is communicated to the controller and matched with the first action or first plurality of actions in the plurality of mappings in the second data array.

2. The lighting system of claim 1, wherein the controller transmits the third data array representation through a network interface.

3. The lighting system of claim 1, wherein the second data array representation of a plurality of mappings is transformed by the execution of a plurality of logical instructions by the processing unit of the controller.

4. The lighting system of claim 3, wherein the plurality of logical instructions depend on sensory signals at a prior time.

5. The lighting system of claim 3, wherein the plurality of logical instructions comprises a game for entertainment, such that a plurality of manners of touch at a plurality of light-emitting units is part of a sequence of actions comprising the game.

6. The lighting system of claim 1, wherein the second data array representation of a plurality of mappings is replaceable with a new data array received by the controller through a network interface.

7. The lighting system of claim 6, wherein the new data array is created by a secondary computing device, not part of the lighting system, which is coupled to the controller through a network interface.

8. The lighting system of claim 7, wherein the secondary computing device is a device with a screen comprising a graphical user interface.

9. The lighting system of claim 1, wherein the touch sensor is comprised of electronic components that performs capacitive touch sensing.

10. The lighting system of claim 1, wherein the manner of touch is comprised of the touching a light-emitting unit or a plurality of light-emitting units with a finger.

11. The lighting system of claim 1, wherein the manner of touch is comprised of the swiping motion of a finger across a light-emitting unit or a plurality of light-emitting units.

12. The lighting system of claim 1, wherein an action in the third data array representation is a reconfiguration of the light emission at a light-emitting unit or a plurality of light-emitting units.

13. The lighting system of claim 12, wherein the reconfiguration of the light emission is comprised of the switch-on action or the switch-off action for the light emission from the lighting system.

14. The lighting system of claim 1, wherein an action in the third data array representation is the actuation of a secondary device, not part of the lighting system, which is coupled to the controller through a network interface.

15. A method for providing configurable touch triggers, the method comprising: storing in memory: a first data array representation of a physical arrangement of a plurality of light-emitting units and a controller, and a second data array representation of a plurality of mappings between a sensory signal at a physical position of a lighting system, and an action of a plurality of actions; and generating a third data array representation of a first action or a first plurality of actions after the sensory signal or a plurality of sensory signals is communicated to the controller and matched with the first action or first plurality of actions in the plurality of mappings in the second data array.

16. The method of claim 15, wherein the first data array is stored as an array data object.

17. The method of claim 15, wherein the first data array is stored as a linked list data object.

18. The method of claim 15, wherein the second data array is stored as an array data object.

19. The method of claim 15, wherein the second data array is stored as a linked list data object.

20. A non-transitory computer readable medium, storing machine interpretable instructions, which when executed by a processor, cause the processor to perform a method for providing configurable touch triggers, the method comprising: storing in memory: a first data array representation of a physical arrangement of a plurality of light-emitting units and a controller, and a second data array representation of a plurality of mappings between a sensory signal at a physical position of a lighting system, and an action of a plurality of actions; and generating a third data array representation of a first action or a first plurality of actions after the sensory signal or a plurality of sensory signals is communicated to the controller and matched with the first action or first plurality of actions in the plurality of mappings in the second data array.

* * * * *